US010802783B2

(12) United States Patent
Santhakumar et al.

(10) Patent No.: US 10,802,783 B2
(45) Date of Patent: Oct. 13, 2020

(54) VIRTUAL WORKSPACE VIEWPORT FOLLOWING IN COLLABORATION SYSTEMS

(71) Applicant: Haworth, Inc., Holland, MI (US)

(72) Inventors: Satish Santhakumar, Fremont, CA (US); Demian Entrekin, Oakland, CA (US)

(73) Assignee: HAWORTH, INC., Holland, MI (US)

( * ) Notice: Subject to any disclaimer, the term of this patent is extended or adjusted under 35 U.S.C. 154(b) by 706 days.

(21) Appl. No.: 15/147,576

(22) Filed: May 5, 2016

(65) Prior Publication Data

US 2016/0328114 A1    Nov. 10, 2016

Related U.S. Application Data

(60) Provisional application No. 62/157,911, filed on May 6, 2015.

(51) Int. Cl.
*G06F 3/14* (2006.01)
*G06F 9/451* (2018.01)
(Continued)

(52) U.S. Cl.
CPC .......... *G06F 3/1454* (2013.01); *G06F 3/0481* (2013.01); *G06F 3/0485* (2013.01); *G06F 3/04817* (2013.01); *G06F 3/04883* (2013.01); *G06F 9/451* (2018.02); *G06F 9/452* (2018.02); *H04L 12/1813* (2013.01);
(Continued)

(58) Field of Classification Search
CPC . G06F 3/1454; G06F 3/04883; G06Q 10/101; G09G 5/14; G09G 2340/0407
See application file for complete search history.

(56) References Cited

U.S. PATENT DOCUMENTS

| 4,686,332 A | 8/1987 | Greanias et al. |
| 5,008,853 A | 4/1991 | Bly et al. |
| (Continued) | | |

FOREIGN PATENT DOCUMENTS

| JP | 2002116996 A | 4/2002 |
| JP | 2005258877 A | 9/2005 |
| (Continued) | | |

OTHER PUBLICATIONS

Office Action in related U.S. Appl. No. 14/090,830, dated Dec. 3, 2015, 27 pages.

(Continued)

*Primary Examiner* — Li P Sun
*Assistant Examiner* — James T Tsai
(74) *Attorney, Agent, or Firm* — Haynes Beffel & Wolfeld LLP; Mark A. Haynes; Andrew L. Dunlap

(57) ABSTRACT

A collaboration system can be configured to support a large number of active clients in a workspace where the workspace is distributed into disparate groups of objects. While participating in the workspace, a first active client can configure their viewport to follow the viewport of a second active client. This configuration synchronizes the first active client's viewport with the second active client's viewport, including a translation or a zoom of the second active client's viewport. The system can be configured so that the second active client is informed that it is being followed by the first active client.

21 Claims, 16 Drawing Sheets

(51) Int. Cl.
*G06F 3/0481* (2013.01)
*H04M 3/56* (2006.01)
*H04L 12/18* (2006.01)
*H04M 7/00* (2006.01)
*G06F 3/0485* (2013.01)
*G06F 3/0488* (2013.01)
*G06Q 10/10* (2012.01)

(52) U.S. Cl.
CPC ........ *H04L 12/1827* (2013.01); *H04M 3/567* (2013.01); *H04M 7/0027* (2013.01); *G06F 2203/04806* (2013.01); *G06Q 10/101* (2013.01); *G09G 2340/0407* (2013.01)

(56) References Cited

U.S. PATENT DOCUMENTS

| | | |
|---|---|---|
| 5,220,657 A | 6/1993 | Bly et al. |
| 5,309,555 A | 5/1994 | Akins et al. |
| 5,394,521 A | 2/1995 | Henderson, Jr. et al. |
| 5,446,842 A | 8/1995 | Schaeffer et al. |
| 5,537,526 A | 7/1996 | Anderson et al. |
| 5,689,628 A | 11/1997 | Robertson |
| 5,781,732 A | 7/1998 | Adams |
| 5,818,425 A | 10/1998 | Want et al. |
| 5,835,713 A | 11/1998 | FitzPatrick et al. |
| 5,872,924 A | 2/1999 | Nakayama et al. |
| 5,938,724 A | 8/1999 | Pommier et al. |
| 6,078,921 A | 6/2000 | Kelley |
| 6,084,584 A | 7/2000 | Nahi et al. |
| 6,128,014 A | 10/2000 | Nakagawa et al. |
| 6,167,433 A | 12/2000 | Maples et al. |
| 6,320,597 B1 | 11/2001 | Ieperen |
| 6,342,906 B1 | 1/2002 | Kumar et al. |
| 6,343,313 B1 | 1/2002 | Salesky et al. |
| 6,564,246 B1 | 5/2003 | Varma et al. |
| 6,710,790 B1* | 3/2004 | Fagioli ................. G06F 3/0481 715/778 |
| 6,778,989 B2 | 8/2004 | Bates et al. |
| 6,911,987 B1 | 6/2005 | Mairs et al. |
| 6,930,673 B2 | 8/2005 | Kaye et al. |
| 7,003,728 B2 | 2/2006 | Berque |
| 7,043,529 B1 | 5/2006 | Simonoff |
| 7,129,934 B2 | 10/2006 | Luman et al. |
| 7,171,448 B1 | 1/2007 | Danielsen et al. |
| 7,356,563 B1 | 4/2008 | Leichtling et al. |
| 7,450,109 B2 | 11/2008 | Halcrow et al. |
| D600,703 S | 9/2009 | LaManna et al. |
| 7,908,325 B1 | 3/2011 | Pabla et al. |
| 8,209,308 B2 | 6/2012 | Rueben et al. |
| D664,562 S | 7/2012 | McCain et al. |
| 8,402,391 B1 | 3/2013 | Doray et al. |
| 8,407,290 B2 | 3/2013 | Abt, Jr. et al. |
| 9,201,854 B1 | 12/2015 | Kloiber et al. |
| 9,298,834 B2 | 3/2016 | Kleppner et al. |
| 9,465,434 B2 | 10/2016 | Mason |
| 9,471,192 B2 | 10/2016 | Mason |
| 9,479,548 B2 | 10/2016 | Jensen et al. |
| 9,479,549 B2 | 10/2016 | Pearson |
| 2003/0020671 A1 | 1/2003 | Santoro et al. |
| 2004/0060037 A1 | 3/2004 | Damm et al. |
| 2004/0083264 A1 | 4/2004 | Veselov |
| 2004/0093331 A1 | 5/2004 | Garner et al. |
| 2004/0150627 A1 | 8/2004 | Luman et al. |
| 2004/0155871 A1 | 8/2004 | Perski et al. |
| 2004/0243605 A1 | 12/2004 | Bernstein et al. |
| 2004/0243663 A1 | 12/2004 | Johanson et al. |
| 2005/0060656 A1 | 3/2005 | Martinez et al. |
| 2005/0262107 A1 | 11/2005 | Bergstraesser et al. |
| 2005/0273700 A1 | 12/2005 | Champion et al. |
| 2006/0012580 A1 | 1/2006 | Perski et al. |
| 2006/0066588 A1 | 3/2006 | Lyon et al. |
| 2006/0211404 A1 | 9/2006 | Cromp et al. |
| 2006/0220982 A1 | 10/2006 | Ueda |
| 2006/0224427 A1 | 10/2006 | Salmon |
| 2006/0294473 A1 | 12/2006 | Keely et al. |
| 2007/0136685 A1* | 6/2007 | Bhatla .................... G09G 5/14 715/800 |
| 2007/0262964 A1 | 11/2007 | Zotov et al. |
| 2008/0114844 A1 | 5/2008 | Sanchez et al. |
| 2008/0143818 A1 | 6/2008 | Ferren et al. |
| 2008/0163053 A1 | 7/2008 | Hwang et al. |
| 2008/0177771 A1 | 7/2008 | Vaughn |
| 2008/0201339 A1 | 8/2008 | McGrew et al. |
| 2008/0207188 A1 | 8/2008 | Ahn et al. |
| 2008/0301101 A1 | 12/2008 | Baratto et al. |
| 2009/0089682 A1 | 4/2009 | Baier et al. |
| 2009/0128516 A1 | 5/2009 | Rimon et al. |
| 2009/0153519 A1 | 6/2009 | Suarez Rovere |
| 2009/0160786 A1 | 6/2009 | Finnegan |
| 2009/0174679 A1 | 7/2009 | Westerman |
| 2009/0195518 A1 | 8/2009 | Mattice et al. |
| 2009/0207146 A1 | 8/2009 | Shimasaki et al. |
| 2009/0217177 A1 | 8/2009 | DeGrazia |
| 2009/0234721 A1 | 9/2009 | Bigelow et al. |
| 2009/0251457 A1 | 10/2009 | Walker et al. |
| 2009/0278806 A1 | 11/2009 | Duarte et al. |
| 2010/0011316 A1 | 1/2010 | Sar et al. |
| 2010/0017727 A1 | 1/2010 | Offer et al. |
| 2010/0073454 A1 | 3/2010 | Lovhaugen et al. |
| 2010/0132034 A1 | 5/2010 | Pearce et al. |
| 2010/0192091 A1* | 7/2010 | Oishi .................... G06F 3/1423 715/799 |
| 2010/0205190 A1 | 8/2010 | Morris et al. |
| 2010/0211920 A1 | 8/2010 | Westerman et al. |
| 2010/0306650 A1 | 12/2010 | Oh et al. |
| 2010/0306696 A1 | 12/2010 | Groth et al. |
| 2010/0309148 A1 | 12/2010 | Fleizach et al. |
| 2010/0318921 A1 | 12/2010 | Trachtenberg et al. |
| 2010/0328306 A1 | 12/2010 | Chau et al. |
| 2011/0047505 A1 | 2/2011 | Fillion et al. |
| 2011/0050640 A1 | 3/2011 | Lundback et al. |
| 2011/0063191 A1 | 3/2011 | Leung et al. |
| 2011/0069184 A1 | 3/2011 | Go |
| 2011/0154192 A1 | 6/2011 | Yang et al. |
| 2011/0183654 A1 | 7/2011 | Lanier et al. |
| 2011/0191343 A1 | 8/2011 | Heaton et al. |
| 2011/0197147 A1 | 8/2011 | Fai |
| 2011/0197157 A1 | 8/2011 | Hoffman et al. |
| 2011/0202424 A1 | 8/2011 | Chun et al. |
| 2011/0208807 A1 | 8/2011 | Shaffer |
| 2011/0225494 A1 | 9/2011 | Shmuylovich et al. |
| 2011/0243380 A1 | 10/2011 | Forutanpour et al. |
| 2011/0246875 A1 | 10/2011 | Parker et al. |
| 2011/0264785 A1 | 10/2011 | Newman et al. |
| 2011/0271229 A1 | 11/2011 | Yu |
| 2012/0019452 A1 | 1/2012 | Westerman |
| 2012/0030193 A1 | 2/2012 | Richberg et al. |
| 2012/0050197 A1 | 3/2012 | Kemmochi |
| 2012/0075212 A1 | 3/2012 | Park et al. |
| 2012/0124124 A1 | 5/2012 | Beaty et al. |
| 2012/0127126 A1 | 5/2012 | Mattice et al. |
| 2012/0169772 A1 | 7/2012 | Werner et al. |
| 2012/0176328 A1 | 7/2012 | Brown et al. |
| 2012/0179994 A1 | 7/2012 | Knowlton et al. |
| 2012/0229425 A1* | 9/2012 | Barrus ................ G06F 3/04883 345/179 |
| 2012/0254858 A1 | 10/2012 | Moyers et al. |
| 2012/0260176 A1 | 10/2012 | Sehrer |
| 2012/0274583 A1 | 11/2012 | Haggerty |
| 2012/0278738 A1 | 11/2012 | Kruse et al. |
| 2012/0320073 A1 | 12/2012 | Mason |
| 2013/0004069 A1 | 1/2013 | Hawkins et al. |
| 2013/0027404 A1 | 1/2013 | Sarnoff |
| 2013/0047093 A1 | 2/2013 | Reuschel et al. |
| 2013/0086487 A1 | 4/2013 | Findlay et al. |
| 2013/0198653 A1 | 8/2013 | Tse et al. |
| 2013/0218998 A1 | 8/2013 | Fischer et al. |
| 2013/0222371 A1 | 8/2013 | Reitan |
| 2013/0246969 A1* | 9/2013 | Barton ................ G06F 3/0484 715/788 |
| 2013/0346878 A1 | 12/2013 | Mason |
| 2013/0346910 A1 | 12/2013 | Mason |
| 2014/0013234 A1 | 1/2014 | Beveridge et al. |

(56) References Cited

U.S. PATENT DOCUMENTS

| | | | |
|---|---|---|---|
| 2014/0033067 | A1 | 1/2014 | Pittenger et al. |
| 2014/0040767 | A1 | 2/2014 | Bolia |
| 2014/0055400 | A1 | 2/2014 | Reuschel |
| 2014/0062957 | A1 | 3/2014 | Perski et al. |
| 2014/0063174 | A1* | 3/2014 | Junuzovic ............ G06Q 10/101 348/14.02 |
| 2014/0222916 | A1 | 8/2014 | Foley et al. |
| 2014/0223334 | A1 | 8/2014 | Jensen et al. |
| 2014/0223335 | A1 | 8/2014 | Pearson |
| 2014/0282229 | A1* | 9/2014 | Laukkanen ........... G06F 3/0481 715/788 |
| 2014/0380193 | A1* | 12/2014 | Coplen ............... G06F 3/04847 715/753 |
| 2015/0007040 | A1 | 1/2015 | Xu et al. |
| 2015/0007055 | A1 | 1/2015 | Lemus et al. |
| 2015/0089452 | A1 | 3/2015 | Dorninger |
| 2015/0185990 | A1* | 7/2015 | Thompson ............ G06F 3/0484 715/800 |
| 2015/0248384 | A1 | 9/2015 | Luo et al. |
| 2015/0279071 | A1 | 10/2015 | Xin |
| 2015/0331489 | A1* | 11/2015 | Edwardson ........... G06F 3/1423 345/156 |
| 2016/0085381 | A1* | 3/2016 | Parker ................... G06F 3/1454 715/753 |
| 2016/0142471 | A1* | 5/2016 | Tse ........................ G06F 3/0488 715/753 |
| 2016/0232647 | A1* | 8/2016 | Carlos ................... G06F 3/1454 |
| 2016/0328098 | A1 | 11/2016 | Santhakumar et al. |
| 2017/0090852 | A1 | 3/2017 | Harada |
| 2017/0235537 | A1 | 8/2017 | Liu et al. |
| 2017/0315767 | A1* | 11/2017 | Rao ......................... G06F 3/147 |
| 2017/0330150 | A1 | 11/2017 | Foley et al. |

FOREIGN PATENT DOCUMENTS

| | | |
|---|---|---|
| JP | 2010129093 A | 6/2010 |
| JP | 2010134897 A | 6/2010 |
| JP | 2010165178 A | 7/2010 |
| JP | 2010218313 A | 9/2010 |
| WO | 2011029067 A2 | 3/2011 |
| WO | 2011048901 A1 | 4/2011 |
| WO | 2012162411 A1 | 11/2012 |
| WO | 2014023432 A1 | 2/2014 |

OTHER PUBLICATIONS

US Appeal Brief Filed in parent case U.S. Appl. No. 14/090,830 dated Dec. 6, 2017, 29 pages.

US Supplemental Appeal Brief Filed in parent case U.S. Appl. No. 14/090,830 dated Jan. 5, 2018, 7 pages.

"Ergonomics Data and Mounting Heights," Ergonomic Ground Rules, last revised Sep. 22, 2010, 2 pgs.

Office Action in related U.S. Appl. No. 15/147,224, dated Feb. 7, 2018, 16 pages.

PCT/US2016/031000—International Search Report and Written Opinion dated Aug. 16, 2016, 14 pages.

Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2014.

Anacore, "Anacore Presents Synthesis", InfoComm 2012: Las Vegas, NV, USA, Jun. 9-15, 2012, 2 pages, screen shots taken from http://www.youtube.com/watch?v=FbQ9PIc5aHk (visited Nov. 1, 2013).

Arna Ionescu et al., "WorkspaceNavigator: Tools for Capture, Recall and Reuse using Spatial Cues in an Interactive Workspace," 2002 <URL=https://hci.stanford.edu/research/wkspcNavTR.pdf>.

Brad Johanson et al. ("Johanson"), "The Event Heap: an Enabling Infrastructure for Interactive Workspaces," 2000, <URL=https://graphics.stanford.edu/papers/eheap;/>.

EP 12789695.9—Supplemental European Search Report dated Nov. 19, 2014, 9 pgs.

Masters Thesis: "The ANA Project, Development of the ANA-Core Software" Ariane Keller, Sep. 21, 2007, ETH Zurich, 92 pages.

Office Action in related U.S. Appl. No. 14/090,830, dated May 5, 2016, 35 pages.

PCT Search Report from PCT/US2016/031000, corresponding to U.S. Appl. Nos. 15/147,576 and 15/147,224, dated Aug. 16, 2016, 14 pgs.

PCT/US2012/039176—International Search Report and Written Opinion dated Sep. 24, 2012, 15 pgs.

PCT/US2014/014489—International Search Report and Written Opinion dated May 30, 2014, 13 pages.

PCT/US2014/014494—International Search Report and Written Opinion dated May 30, 2014, 10 pages.

PCT/US2014/018375—International Search Report and Written Opinion dated Jul. 1, 2014, 16 pgs.

SQL for Dummies, 7th Edition, published on Jul. 5, 2012.

U.S. Appl. No. 13/758,993 entitled Line Drawing Behavior for Digital Whiteboard filed Feb. 4, 2013, 46 pages.

W3C Working Group Note, HTML: The Markup Language (an HTML language reference), http://www.w3.org/TR/html-markup/iframe.html[Aug. 4, 2016 2:01:59 PM], 3 pages.

EP 14808241.5—First Office Action dated Jan. 25, 2018, 10 pages.

EP 14808241.5—Response to First Office Action dated Jan. 25, 2018 filed on May 22, 2018, 15 pages.

JP 2016-518315—First Office Action dated Feb. 6, 2018, 7 pages.

Office Action in related U.S. Appl. No. 15/340,810, dated Jun. 18, 2018, 20 pages.

US Appeal Brief Filed in parent case U.S. Appl. No. 14/090,830 dated Jan. 5, 2018, 7 pages.

US Examiner's 2nd Answer to Appeal Brief in parent case U.S. Appl. No. 14/090,830 dated Mar. 28, 2018, 23 pages.

US Examiner's Answer to Appeal Brief in parent case U.S. Appl. No. 14/090,830 dated Mar. 19, 2018, 23 pages.

US Reply Brief in parent case U.S. Appl. No. 14/090,830 dated Apr. 17, 2018, 7 pages.

PCT Search Report and Written Opinion in PCT/US2017/017432 dated May 31, 2017, 14 pages.

AU 2014275495—First Office Action dated Mar. 25, 2019, 3 pages.

EP 16790089-3—EP Extended Search Report dated Jan. 2, 2019, 10 pages.

PCT IPRP and Written Opinion from PCT/US2017/017432 dated Aug. 23, 2018, 10 pages.

U.S. Final Office Action in U.S. Appl. No. 15/147,224 dated Dec. 13, 2018, 13 pages.

KR 10-2016-7000174—Request for Examination and Voluntary Amendment, 31 pages, Feb. 25, 2019.

U.S. Appl. No. 15/668,009—Office Action dated Dec. 26, 2019, 18 pages.

AU 2014275495—Response to First Examination Report dated Mar. 25, 2019 filed Jan. 29, 2020, 131 pages.

U.S. Appl. No. 16/375,487—Preliminary Amendment filed Nov. 6, 2019, 11 pages.

U.S. Appl. No. 15/791,351—Office Action dated Dec. 17, 2019, 63 pages.

\* cited by examiner

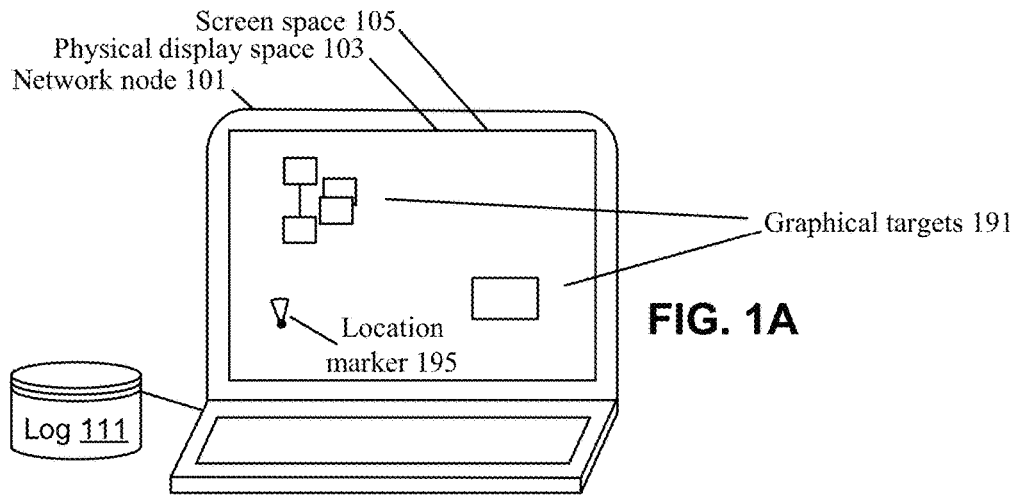
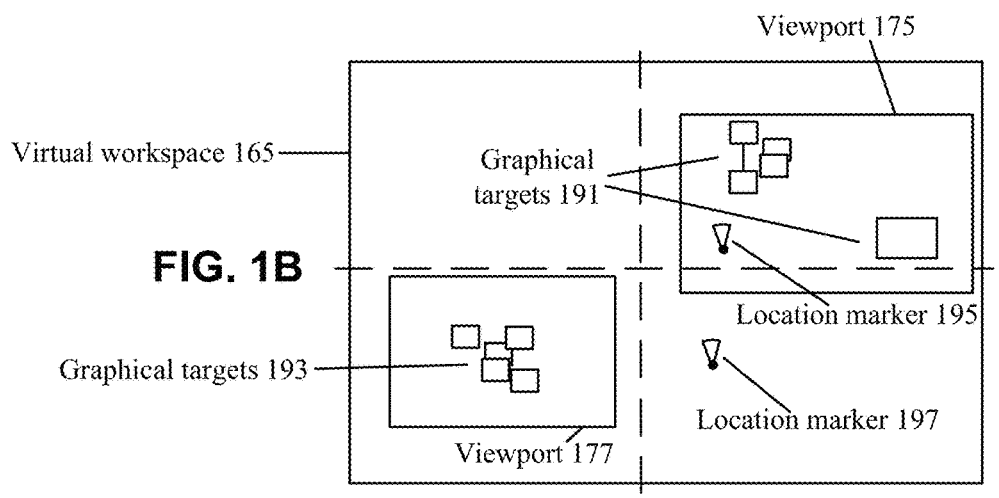
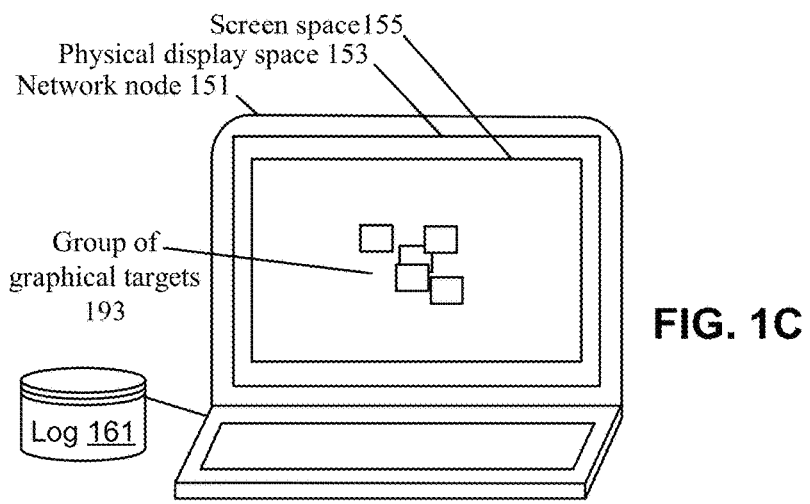

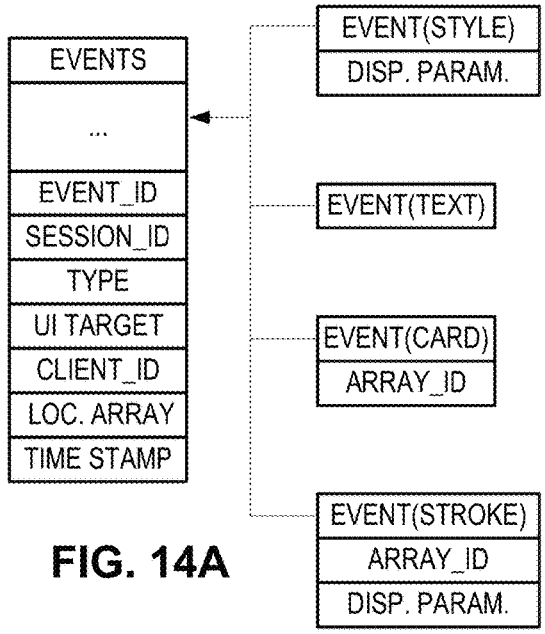
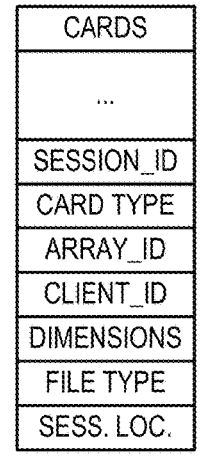
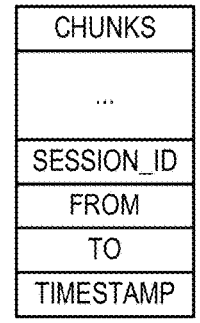
FIG. 14A
FIG. 14B
FIG. 14C
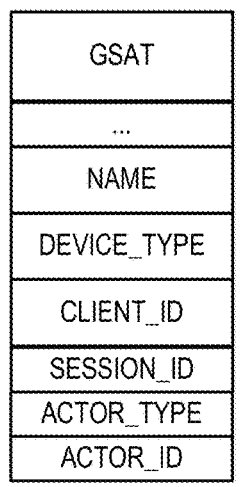
FIG. 14F
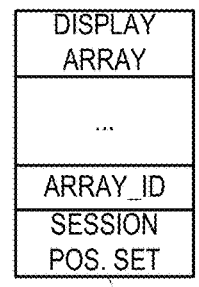
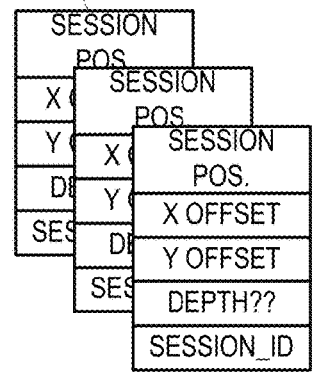
FIG. 14E
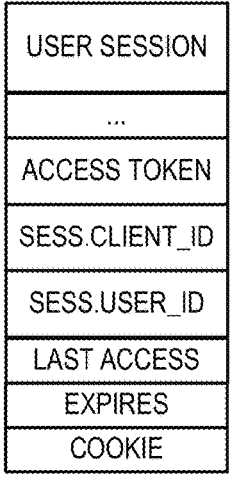
FIG. 14D

VIRTUAL WORKSPACE VIEWPORT FOLLOWING IN COLLABORATION SYSTEMS

RELATED APPLICATIONS

Benefit is claimed of U.S. Provisional Application No. 62/157,911, entitled System and Method for Emulation of a Viewport Within a Shared Workspace, filed 6 May 2015, which application is incorporated herein by reference.

The following co-pending, commonly owned, U.S. patent application is incorporated by reference as if fully set forth herein, U.S. application Ser. No. 14/090,830, entitled Collaboration System Including A Spatial Event Map, filed 26 Nov. 2013

FIELD OF THE TECHNOLOGY DISCLOSED

The technology disclosed relates to apparatuses, methods, and systems for digital collaboration, and more particularly to digital display systems which facilitate multiple simultaneous users having access to global workspace data.

DESCRIPTION OF RELATED ART

Digital displays are often used for interactive presentations and other purposes in a manner analogous to whiteboards. Some displays are networked and can be used for collaboration, so that modifications made to the display image on one display are replicated on another display. Collaboration systems can be configured to operate collaboration sessions in which users located at different client platforms share a workspace as described in our co-pending U.S. application Ser. No. 14/090,830, entitled Collaboration System Including A Spatial Event Map, filed 26 Nov. 2013 (US 2014-0222916-A1, published 7 Aug. 2014). The distributed nature of such systems allows multiple users in different places to interact with, and change, data in the same workspace at the same time, and also at times when no other user is observing the workspace. Also, the workspace can be very large, essentially unbounded in some systems.

One problem associated with collaboration systems using large workspaces, relates to navigation around the workspace. Because the workspace can be essentially unbounded, and users can place graphical objects anywhere in the workspace, it can be difficult to discover and track the work being done by collaborators.

SUMMARY

A system is disclosed that supports the storing and tracking of a plurality of collaboration sessions, each of which is accessible across multiple devices and locations. The technology disclosed includes a method for one client to find and track on their display the transactions generated by another client within a shared workspace.

One system described herein comprises one or more data processors including memory storing computer programs for a database including one or more workspace data structures for corresponding workspaces. A workspace data structure can include a spatial event map for a specific workspace.

The system described includes a first network node including a display having a physical display space, a user input device, a processor and a communication port. The first network node can be configured with logic to establish communication with one or more other network nodes, which can include for example server-side network nodes and peer client-side network nodes, as a participant client in a workspace session. The first network node can have memory, or have access to memory, to store collaboration data identifying graphical targets having locations in a virtual workspace used in the workspace session. The collaboration data can be a spatial event map, as described herein, or other type of data structure, including locations in a virtual workspace of respective graphical targets. The first network node in this system has logic to define a local client viewport having a location and dimensions within the workspace, and to map the local client viewport to a local client screen space in the physical display space at the first network node. The first network node can also provide a user interface displaying a list of participant clients in the session at other network nodes, and for receiving input indicating a selected other participant client from the list. The first network node can receive messages containing a location in the workspace of a participant client viewport in use at the selected other participant client. Using the location of the participant client viewport, the first network nodes can update the location of the local client viewport to the identified location of the participant client viewport in use at the selected other participant client, and render on the screen space graphical targets having locations within the updated local client viewport. This implements an optional behavior for a client in the collaboration session than can be called "follow."

A node for use in a collaboration system is described that comprises a display having a physical display space, a user input device, a processor and a communication port, the processor being configured with logic to implement the follow mode. The logic can be configured to:

establish communication with one or more other network nodes;

store collaboration data identifying graphical targets having locations in a virtual workspace, the collaboration data including locations in the virtual workspace of the identified graphical targets;

compute a mapping of a local client viewport having a location and dimensions in the virtual workspace to a local client screen space having dimensions in the physical display space, and render graphical targets having locations in the local client viewport to the local client screen space as a function of the mapping; and determine the location and dimensions in the virtual workspace of the local client viewport, the logic to determine including (i) a first mode under local control such as touch screen and mouse gestures for panning and zooming to change the local client viewport in response to user input at the first network node; and (ii) a second mode, or follow mode, to monitor messages containing locations and changes of location in the virtual workspace of a remote client viewport from a second network node in the one or more network nodes, and to change the local client viewport using the locations and changes of location contained in the messages.

The local client screen space in a network node has an aspect ratio, and a resolution including a number of pixels determined by the display and display driver at the network node. The resolution can be static in the sense that it is unchanging during changes of the local client viewport in the follow mode. The messages containing locations and changes of location include a specification of dimensions having an aspect ratio of the remote client viewport. The logic to change the local client viewport can define dimensions of the local client viewport as a function of differences between the aspect ratio of the local client screen space and the aspect ratio of the remote client viewport. In this way, the graphical objects rendered on remote client screen space using the remote client viewport are reproduced on the local client screen space using the local client viewport without clipping.

Also, the local client screen space has a screens space resolution, that can be static, including a number of pixels, and the dimensions of the local client viewport define a changeable resolution including a number of virtual pixels in the virtual workspace. The logic to compute a mapping determines a zoom factor based on differences in the static, screen space resolution and the changeable resolution.

A node for use in a collaboration system is described that comprises a display having a physical display space, a user input device, a processor and a communication port, the processor being configured with logic to implement dynamic location marker creation, movement, searching and selection. The logic at a particular network can be configured to:

establish communication with one or more other network nodes;

store collaboration data identifying graphical targets having locations in a virtual workspace, the collaboration data including locations in the virtual workspace of the identified graphical targets;

compute a mapping of a local client viewport having a location and dimensions in the virtual workspace to a local client screen space having dimensions in the physical display space, and render graphical targets having locations in the local client viewport to the local client screen space as a function of the mapping;

provide a user interface displaying a list of location markers in the workspace, a location marker having a marked location in the workspace, and for receiving input indicating a selected location marker from the list;

determine the location and dimensions in the virtual workspace of the local client viewport, including to update the location of the local client viewport to the marked location of the selected location marker; and render on the screen space graphical targets having locations within the local client viewport.

The logic to determine the location and dimensions of the local client viewport includes logic to change the local client viewport in response to pointer or touch based user input gestures at the first network node indicating movement or zoom of the local client viewport.

The user interface displaying a list of location markers also displays a selectable entry for default location for the workspace, and including logic to update the location of the local client viewport to the default location upon selection of the selectable entry.

The logic can be configured, so that in response to the selection of the selected location marker, the local client viewport location is changed without changing its dimensions in the virtual workspace.

The user interface displaying a list of location markers includes a search function based on querying location marker tags in embodiments described herein.

The actions usable in the records of an events in the log of events include creation, movement and deletion of location markers.

The network nodes can include logic to send messages to other network nodes, the messages identifying events including creation or movement of a location marker, and the logic is responsive to receipt of a message from a second network node to update the list of location markers.

In a described implementation, the first network node can accept input data from the user input device creating events relating to modification of the local client viewport, and create a client viewport data object defining the location of the local client viewport within the workspace. The first network node can send the client viewport data object to one or more other network nodes participating in the session, to support the follow option.

Also described is a system comprising a first network node providing a user interface displaying a list of location markers in the workspace in the session, where a location marker has a marked location in the workspace. The user interface can receive input indicating a selected location marker from the list. In response to selection of a selected location marker, the system can update the location of the local client viewport to the marked location, and render on the screen space graphical targets having locations within the updated local client viewport.

In another implementation, a system can include a spatial event map system, comprising a data processor, and memory storing a spatial event map which locates events in a virtual workspace, and provides communication resources for collaborative displays.

Also, methods of operating client nodes in a collaboration session as described herein, and non-transitory computer readable media storing computer programs, implement logical functions as described herein, for a client in a collaboration session are described.

The above summary is provided in order to provide a basic understanding of some aspects of the collaboration system described herein. This summary is not intended to identify key or critical elements of the technology disclosed or to delineate a scope of the technology disclosed.

BRIEF DESCRIPTION OF THE DRAWINGS

The included drawings are for illustrative purposes and serve to provide examples of structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures. The technology disclosed will be described with respect to specific embodiments thereof, and reference will be made to the drawings, which are not drawn to scale, and in which:

FIGS. 1A, 1B, and 1C (collectively FIG. 1) illustrate one implementation of a system of network nodes that collaborate within a virtual workspace.

FIGS. 14A, 14B, 14C, 14D, 14E, and 14F (collectively FIG. 14) represent data structures which can be part of workspace data maintained by a database at the collaboration server 1305.

DETAILED DESCRIPTION

Figure 2:
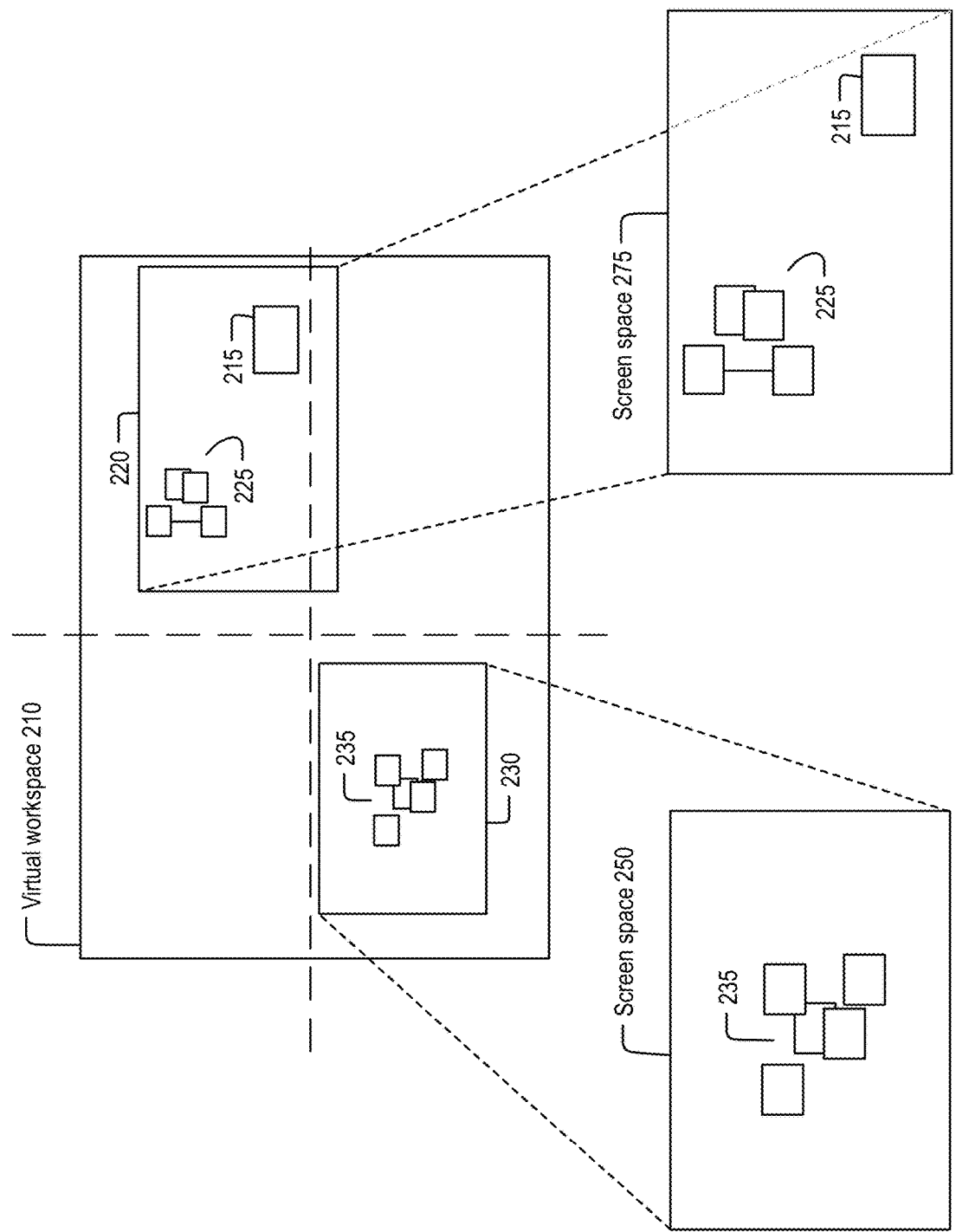
FIG. 2 illustrates one implementation of two network nodes having viewports in distinct areas of an unbounded virtual workspace.

The following description is presented to enable any person skilled in the art to make and use the technology disclosed, and is provided in the context of particular applications and requirements. Various modifications to the disclosed embodiments will be readily apparent to those skilled in the art, and the general principles defined herein may be applied to other embodiments and applications without departing from the spirit and scope of the technology disclosed. Thus, the technology disclosed is not intended to be limited to the embodiments shown, but is to be accorded the widest scope consistent with the principles and features disclosed herein.

The "unlimited workspace" problem includes the need to track how people and devices interact with the workspace over time. In one implementation, this can be addressed by allowing a first system to follow the actions of a second system. In another implementation, a first system can save a location with a location marker, and make the location marker available to a second system. In order to solve this core problem, a Spatial Event Map has been created, which includes a system architecture supporting collaboration using a plurality of spatial event maps and a plurality of collaboration groups. The Spatial Event Map contains information needed to define objects and events in a workspace. The Spatial Event Map comprises a data structures specifying events having locations in a virtual collaboration space. The events, maps of events in the space, and access to the space by multiple users, including multiple simultaneous users support collaboration from users around the globe.

Space: In order to support an unlimited amount of spatial information for a given collaboration session, a way is provided to organize a virtual space termed the workspace, which can for example be characterized by a two-dimensional Cartesian plane with essentially unlimited extent in one or both of the dimensions for example, in such a way that new content can be added to the space, that content can be arranged and rearranged in the space, that a user can navigate from one part of the space to another, and that a user can easily find needed things in the space when required.

Events: Interactions with the workspace are handled as events. People, via tangible user interface devices, and systems can interact with the workspace. Events have data that can define or point to a target graphical object to be displayed on a physical display, and an action as creation, modification, movement within the workspace and deletion of a target graphical object, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content, and understand how the spatial data evolves over time. Also, the spatial event map can have a reasonable size in terms of the amount of data needed, while also defining an unbounded workspace.

There can be several different kinds of events in the system. Events can be classified as persistent events, also referred to as history events that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace in some embodiments of both persistent and ephemeral events on workspaces in the system.

Map: A map of events in the workspace can include the sum total of discrete spatial events that relate to graphical objects having locations in the workspace. Events in the map of a workspace can be "mapped" to a physical display or screen that has a displayable area referred to herein as a screen space, of specific size. A client can specify a viewport in the workspace, having a location and a dimension in the workspace, and then map the events in the viewport area to the screen space for display.

Multi-User Access: One key characteristic is that all users, or multiple users, who are working on a workspace simultaneously, should be able to see the interactions of the other users in a near-real-time way. The spatial event map allows users having displays at different physical locations to experience near-real-time events, including both persistent and ephemeral events, within their respective viewports, for all users on any given workspace. The collaboration system architectures described herein enable operation of many workspaces and many user groups.

Widget: A widget is a component of a workspace that the user can interact with or view, e.g. Notes, Images, Clocks, Web Browsers, Video Players, Location Markers, etc. A Window is a widget that is a rectangular region with two diagonally opposite corners. Most widgets are also windows.

In a collaborative environment, it can be beneficial to see what others are working on within the environment. The technology disclosed allows a first network node to follow the events that occur on a second network node without any significant increase in network utilization. This can be accomplished by exchanging messages carrying simple text event records that can include JSON data structures or the like, rather than sending images between network nodes.

The first network node receives descriptions of events from all other participating network nodes within a virtual workspace, and stores at least some of them in a local log. The first network node also creates its own events, and stores at least some of them in the local log. The first network node has a viewport into the virtual workspace that can include any number of graphical targets defined by the events. The first network node can render the objects described by the event records that have coordinates within its viewport, ignoring the event records describing events relating to graphical object located outside of its viewport.

In one example, an operator of the first network node might be interested in watching the events that are happening within a viewport of the second network node as they occur, and as the viewport of the second network node is moved around in the workspace. The first network node can extract event information from the local log that describes the viewport of the second network node, and the graphical targets within the viewport, of the second network node, and render those graphical targets on a local screen space. In another example, an operator of the first network node might want to visit a place within the workspace that was saved by the second network node as a location marker. The first network node can extract event information from the local log that describes the workspace, to identify a location marker saved by the second network node, and then move its viewport to the location of the location marker.

An environment is illustrated by FIGS. 1A-1C, describing a virtual workspace with graphical targets, a viewport, and a screen space. FIG. 1A illustrates a first network node 101 with a physical display space 103 that includes a screen space 105 allocated for use in the collaboration session. As illustrated, the screen space 105 can be coextensive with the physical display space 103 at the first network node, or can consist of an allocated portion, like a window, in the physical display space. The physical display space has a resolution in terms of a number of pixels and an aspect ratio set by the local network node that is independent of the workspace. The resolution in the workspace is based on the coordinate system used, and can include an essentially unbounded number of virtual points that can identify locations in the virtual workspace. In one example, the screen space 105 includes the entire displayable area of, and has the same resolution as, the physical display space 103. In another example, the screen space can be smaller than the physical display space.

In the illustrated example, the network node can include touch sensors on the screen space 105 that can perform as a user input device. The collaboration system client on the network node can access a local log file 111 that can store event records defining spatial event map or other type of data structure representing contents of a currently used workspace. In this example, a set of graphical targets 191, and a location marker 195 are displayed in the screen space 105.

FIG. 1B illustrates a virtual workspace 165, a first viewport 175, and a second viewport 177 that have locations and dimensions in the workspace. A plurality of graphical targets 191 and a graphic target of type first location marker 195, have locations within the first viewport 175. Graphical targets 193 have locations within the second viewport 177. A second location marker 197 has a location within the virtual workspace 165 outside the boundaries of both the first viewport 175 and the second viewport 177.

FIG. 1C shows a second network node 151 with a physical display space 153 and a screen space 155. In the illustrated example, the network node can include touch sensors that can perform as a user input device. The node can have access to a local log file 161 that can store event records defining a spatial event map or other type of data structure representing contents of a virtual workspace, such as the same workspace currently in use at the first network node. In this example, the viewport of the second network node is viewport 177, and maps to the screen space 155. As a result of the mapping, a set of graphical targets 193 is displayed in the screen space 155.

A network node can generate an event to record the creation of a graphical target such as a text box, a location marker, a web page, or a viewport within a virtual workspace. The event can include the location of the graphical target within the virtual workspace, a time of the event, and a target identifier of the graphical target. The network node can then communicate the event to other network nodes participating in the workspace. Each participating network node can store the event in its local log 111, 161. In this example, an event exists in the local log 111, 161 for each of the events creating or modifying or moving the graphical targets 191, 193, the location markers 195, 197, and the viewports 175, 177 within the virtual workspace 165. The graphical targets of the events can be rendered on the screen space 105, 155 by a processor with logic to render the graphical targets.

The processor includes logic to render graphical targets having locations in a viewport to the screen space, and to render only those graphical targets, or portions of graphical targets, that are within the boundaries of the viewport, using a zoom level that is a function of the local screen space resolution and the dimensions of the local client viewport.

A screen space can have a fixed aspect ratio, and fixed resolution in terms of pixels per line, and lines per screen. This aspect ratio and resolution can be used to compute the mapping of the viewport to the screen space. For example, a starting viewport in the workspace can include an array of 1000 points by 1000 lines. The screen space can have the same resolution of 1000 by 1000. However, if a user executes a zoom out operation, the screen space resolution remains the same, but the workspace resolution increases to for example 2000 points by 2000 lines. In this case, the graphical targets of the events in the larger viewport are scaled to fit within the smaller number of pixels in the screen space as a function of the zoom factor. Likewise, if the user executes a zoom in operation, the screen space resolution remains the same, but the workspace resolution decrease to for example 500 points by 500 lines. In this case, the graphical targets of the events in the smaller viewport are scaled to fit within the larger number of pixels in the screen space. A viewport can be specified by a location in the workspace, an aspect ratio of the client screen space, and a zoom level, or ratio of resolution of the viewport compared to that of the screen space.

This allows various devices such as mobile devices, computers, and walls to display respective viewports at a common zoom level and at aspect ratios that match the respective screen spaces. The technology disclosed allows clients to specify viewports independently, so that two viewports may overlap. In one example, a first user modifies a viewport so that it includes an area already included in the viewport of a second user. In this example, the viewports are independent of each other, and one viewport can be modified without affecting the other. In another example, a first user "follows" a second user, whereby the viewport of the first user is determined by the viewport specifications of the second user. In this case, if the screen spaces have the same aspect ratio and resolution, then the screen space of the first user displays the same graphical targets and can be like a replica of the screen space of the second user. In the case in which the aspect ratio and/or resolutions do not match, then the following node can translate the dimensions of the remote client viewport to a local client viewport based on the aspect ratio and resolution of the local client screen space.

Figure 3:
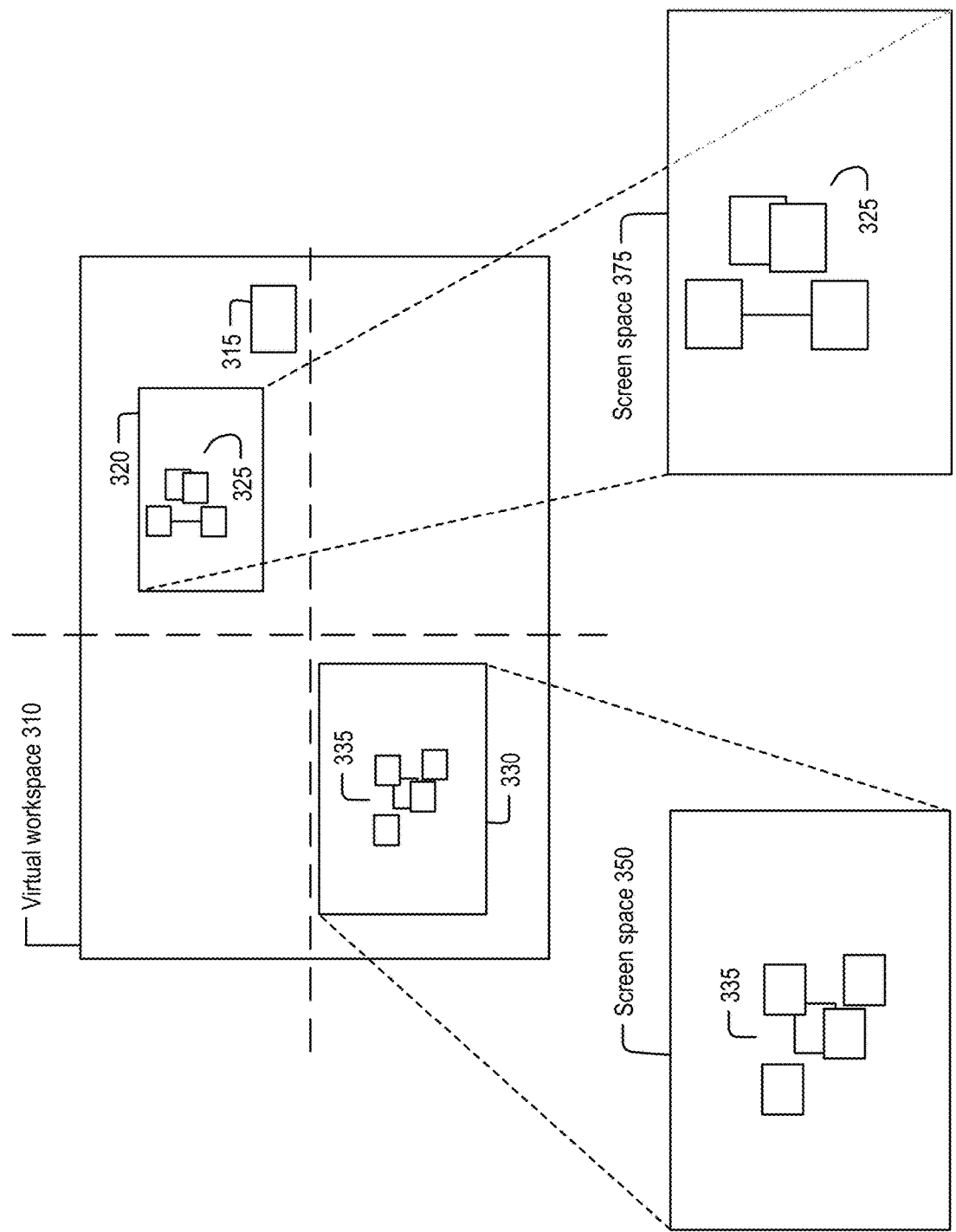
FIG. 3 illustrates how a viewport of one network node can be changed without affecting the viewports of other network nodes.

FIGS. 2, 3, and 4 illustrate the process of a first network node following a viewport in use at a second network node.

FIG. 2 illustrates one implementation of two network nodes having viewports in distinct areas of a virtual workspace. FIG. 2 illustrates a virtual workspace 210 comprising a first viewport 230 and a second viewport 220. A set of graphical targets 235 having locations in the first viewport 230, and a set of graphical targets 225 and a particular graphical target 215 having locations within the second viewport 220 are shown. FIG. 2 also illustrates schematically a first screen space 250 at a first network node and a second screen space 275 at a second network node. In this illustration, the first viewport 230 containing the set of graphical targets 235 is mapped to the first screen space 250, and the set of graphical targets 235 are rendered on it. The second screen space 275 has the graphical targets (225 and 215) in second viewport 220 rendered on it. Each viewport contains a different set of graphical targets. In another example, some or all of the graphical targets can exist outside of the viewports.

FIG. 3 illustrates how a viewport of one network node can be changed without affecting the viewports of other network nodes. FIG. 3 illustrates a second network node changes the dimensions in the workspace of viewport 320 without affecting the viewport 330 of a first network node. In this example, FIG. 3 is based on FIG. 2. FIG. 3 illustrates a virtual workspace 310 comprising a first viewport 330 and a second viewport 320. The first viewport 330 envelops a set of graphical targets 335. The second viewport envelops a set of graphical targets 325. A graphical target 315 exists within the virtual workspace 310 outside of the area enveloped by the first viewport 330 or the second viewport 320. FIG. 3 also illustrates a first screen space 350 and a second screen space 375. The first screen space 350 has the first viewport 330 containing the set of graphical targets 335 rendered on it. The second screen space 375 has the second viewport 320 containing the set of graphical targets 325 rendered on it. The graphical target 315 within the virtual workspace 310 exists outside of either of the viewports 330, 320, and is not rendered on either the first screen space 350 or the second screen space 375.

A difference between FIG. 2 and FIG. 3 is that the viewport 320 has been changed in FIG. 3 to exclude the graphical target 315. A viewport can be changed by changing the zoom level of the viewport by using, for example, a variety of input devices and gestures, including, for example, a zoom wheel on a mouse, or combinations of keys pressed on a keyboard. A viewport can also be changed by a touch screen or mouse gesture that includes "grabbing" a location on the screen space with a mouse or other pointer, and then moving the mouse.

A display is a device comprised of an array of pixels. Complex displays, such as walls 1202, comprise multiple displays in a rectangular array, and have consecutive pixels in the X and Y coordinates managed by a controller. In one implementation, a display can have multiple windows, each window comprising a separate screen space.

For example, a workspace can have a set of objects laid out between coordinates x0=−10000, y0=4500 and x1=5200, y1=−1400, in abstract units. If a client wants to see that set of objects, then it defines a viewport with those coordinates, and then renders that viewport within its screen space, mapping the abstract units of the workspace to the physical units of displayable pixels. If the client wants to see more of the workspace, they can zoom out so that more distributed x0, y0, x1, y1 coordinates of the viewport map to the available space in the screen space. If they want to see a smaller area of the workspace, they zoom in to whatever x0', y0', x1', y1' coordinates they want, and those coordinates are mapped to the screen space of the client. In rendering the viewport to the screen space, scaling of the contents of the viewport can be accomplished through standard graphical scaling techniques.

A change to a viewport is characterized as an event which, in this example, causes a "vc" (Viewport Change) record to be created, stored in the local log, and communicated to other participant clients in the collaborative workspace. An example of a "vc" record for use in an API like that described below, is represented as follow:

// server <--> client
[sender-id, "vc", viewport-rect]
    viewport-rect an array in the form [x1, y1, x2, y2] representing the corners of a section of the workspace being used as the viewport on the sending client.

Other network nodes participating in the collaborative workspace can receive the "vc" record, where it can be stored in the local log. The other network nodes will not act on the "vc" record unless they invoke logic to follow the network node that generated the "vc" record.

Figure 4A:
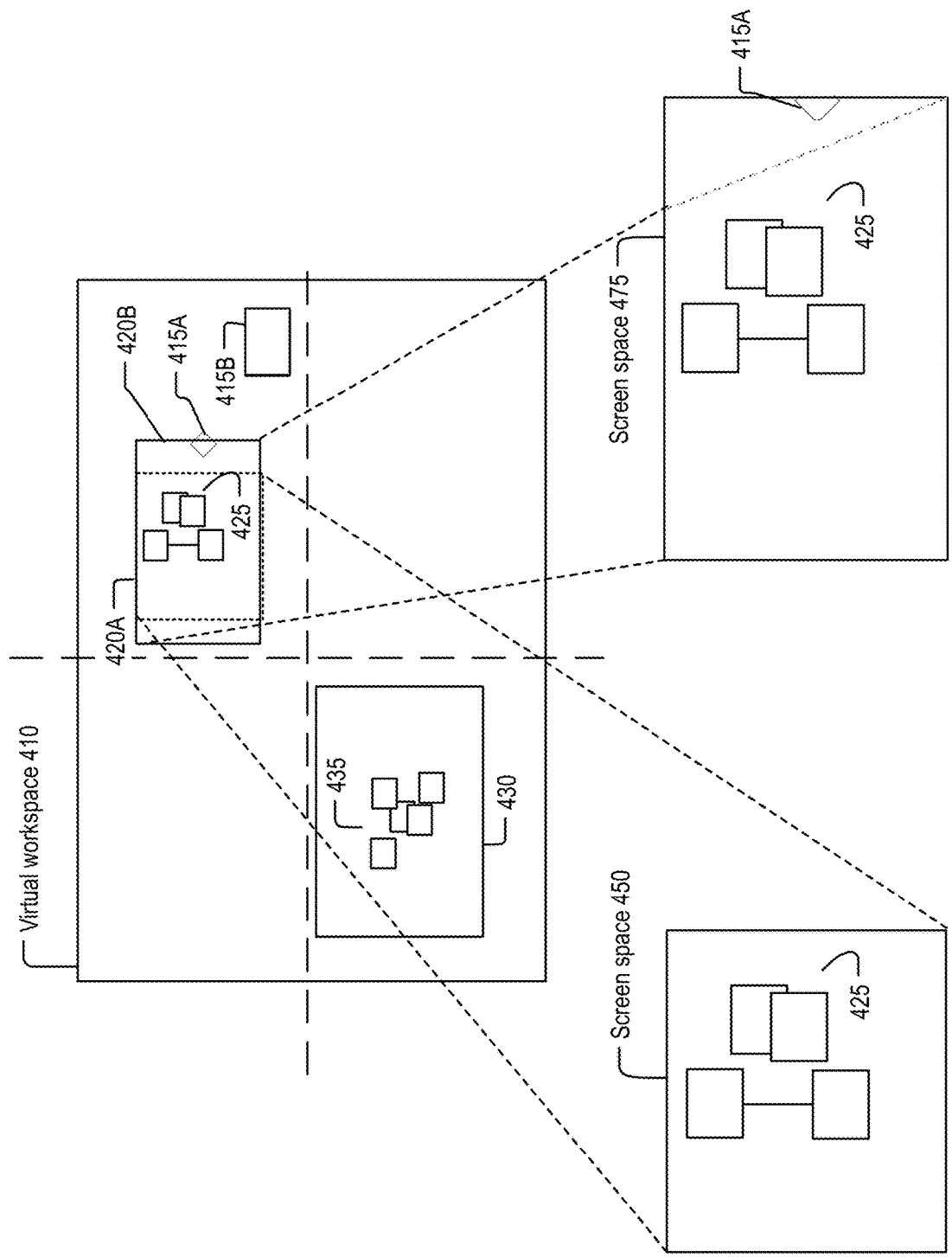
FIGS. 4A, 4B, and 4C (collectively FIG. 4) illustrate a first network node "following" a second network node.
Figure 4B:
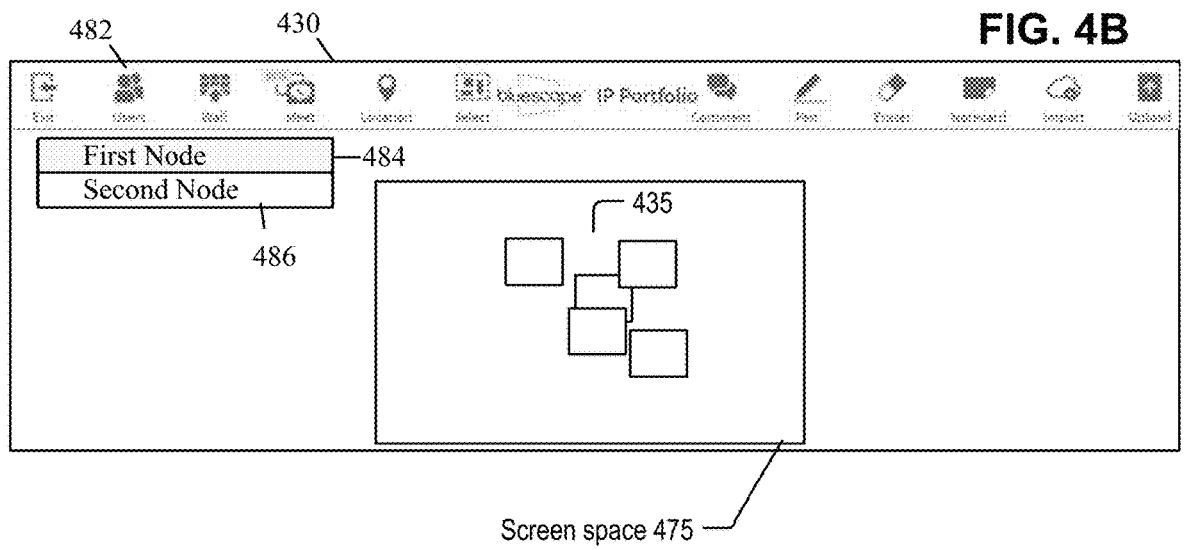
Figure 4C:
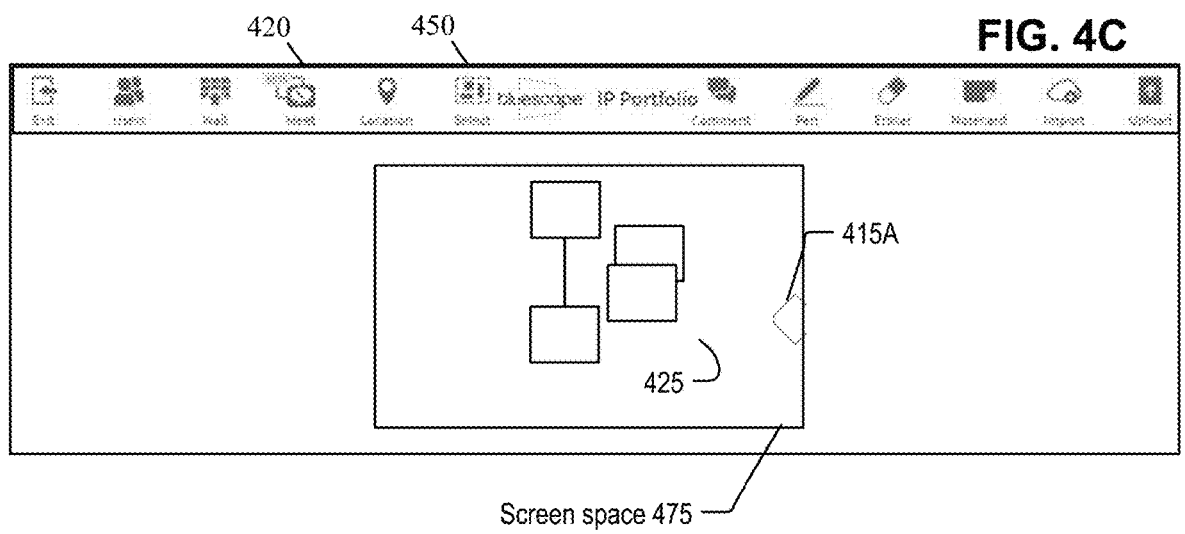

FIGS. 4A, 4B, and 4C illustrate a first network node "following" the viewport in use at a second network node. FIG. 4A illustrates a virtual workspace 410 comprising a first viewport 430, a second viewport 420A and a third viewport 420B. FIG. 4A also illustrates a first screen space 450 and a second screen space 475. The first viewport 430 specifies an area in the virtual workspace 410 that envelops a set of graphical targets 435. The first viewport 430 is not mapped on screen spaces 450 and 475, and corresponds for example to another local client viewport. The second viewport 420A specifies an area in the virtual workspace 410 that envelops a set of graphical targets 425, and is mapped to screen space 450 by the local client that operates screen space 450. The third viewport 420B specifies an area in the virtual workspace 410 that is mapped to the screen space 475, by the local client operating the screen space 475 in an operation to follow the viewport of the first screen space 450. A graphical target 415 exists within the virtual workspace 410 outside of the area enveloped by the first viewport 430 or the second viewport 420A and 42B is this example.

The first screen space 450 has a first aspect ratio, and displays objects having locations within the second viewport 420A (set of graphical targets 425). The second viewport has a matching aspect ratio. The dimension of the viewport in virtual space in the workspace can be a multiple of the aspect ratio that is different from the dimensions in pixels in the screen space 450. The multiple of the aspect ratio establishes a zoom level in the first screen space 450, and this multiple can be changed by the local client viewport.

The second screen space 475 has a second aspect ratio, and uses a viewport 420B having the same aspect ratio as the second screen space, and encompasses the first viewport 420A. The third viewport 420B has dimensions determined using the viewport change messages from the client operating the first screen space, and the parameters of the second screen space 475. In this example, it has the same zoom level and same center point as the first viewport 420A, and thus displays objects having locations within the second viewport 420 (set of graphical targets 425), and has an aspect ratio that matches the second screen space. The graphical target 415A within the virtual workspace 410 exists outside of 420A but overlaps viewport 420B. Thus, graphical target 415A is not rendered on the first screen space 450, and is partially rendered on the second screen space 475. Graphic target 415B is outside the viewports 420A, 420B and 430; and thus, does not appear in the screen space 450 or screen space 475.

FIG. 4B illustrates the second network node prior to selecting the first network node for a follow operation, and in which it has specified the viewport 430 for its local screen space 475 (in this example, the screen space 475 is a window on a display rather than the entire display). The set of graphical targets 435 within the first viewport 430 is rendered on the first screen space 450.

FIG. 4C illustrates the effect of logic at the second network node selecting the second network node to follow. This can be done by logic that determines the viewport specifications in use at the first node for first screen space 450, and generates viewport specifications for the second node. The computation can generate local client viewport specifications for the viewport 420B, having the same zoom level and center point as the viewport 420A, and that encompass the same area in the workspace while having an aspect ratio matching the second screen space 475 as explained above. This can be accomplished by logic that compares the aspect ratio (height/width) of the local screen space 475 to the aspect ratio of the viewport 420A to be followed. If the aspect ratio is 1 or lower, then the height is equal to or greater than the width. In this case, the local client viewport 420B is specified in the workspace to have the height in the workspace of the viewport 420A to be followed, and to have the width in the workspace determined by the aspect ratio of the local screen space 475. If the aspect ratio is greater than 1, then the height is less than the width. In this case, the local client viewport 420B is specified to have the width in the workspace of the viewport 420A to be followed, and to have the height in the workspace determined by the aspect ratio of the screen space 475. In this way, all of the viewport 420A will fall within the viewport 420B, even if the aspect ratios do not match.

In this implementation, the participating network nodes execute a graphical user interface that includes an object such as a menu tab 482 labeled "Users" in this example. The menu tab can be positioned in or next to the screen space 475. (In this illustration the screen space 475 is a small window on the display, for the purposes of the discussion of aspect ratio matching. In other systems, the screen space can include a different portion of the displayable area on the display, including all of the displayable area.) The selection of the menu tab causes a user menu to appear, where the user menu lists the identity of clients, preferably all clients, participating in the collaborative workspace. In this example, the participants in the collaborative workspace are a First Node 484 and a Second Node 486. The First Node 484 is the user name associated with the screen space 450. The Second Node 486 is the user name associated with the screen space 475 of FIG. 4A.

The client can include logic that upon selecting an item from the user menu list, causes a "ve" (Volatile Event) of type "bf" (Begin Follow) to be generated using a template form the API described below, like the following:
// server <--> client
[client-id, "ve", target-id, event-type, event-properties]
  client-id (string) the ID of the originating client
  target-id (string) the ID of the target window to which this event is relevant
  event-type (string) Volatile Event Type
  properties (object) a JSON object describing pertinent key/values for the event Volatile Event Types that can be used in this template relating to the follow mode can include:
  bf Begin Follow: User A begins to follow User B. Used to notify User A that user B is following.
  ef End Follow: User B is no longer following user A. Used to notify user A that user B is no longer following.

First Node 484 is identified by the client-id, and is associated with the first screen space 450, and Second Node 486 is identified by the target-id, and is associated with the second screen space 475 of FIG. 4A.

In this implementation, the Second Node 486 with screen space 475 chooses to follow the First Node 484 with screen space 450. Second Node 484's network node can create and transmit a "ve" record of type "bf" to notify the collaboration session that it is beginning to follow the First Node 484. The Second Node 486 can read through its local log finding the most recent viewport change "vc" record from First Node 484. The specifications of the First Node 486 viewport 420A from the "vc" record, are used to produce specifications for the viewport 420B of the Second Node 484. The Second Node 484 can then use the local viewport 420B to find graphical targets 425 (See, FIG. 4A) within the local viewport 420B to be rendered on the screen space 475.

Any changes in the viewport 420A, such as location or zoom level, of the First Node 484 are shared in the session, and are used to update the local viewport 420B of the Second Node 486, as long as the Second Node 486 follows the First Node 484.

Figure 5:
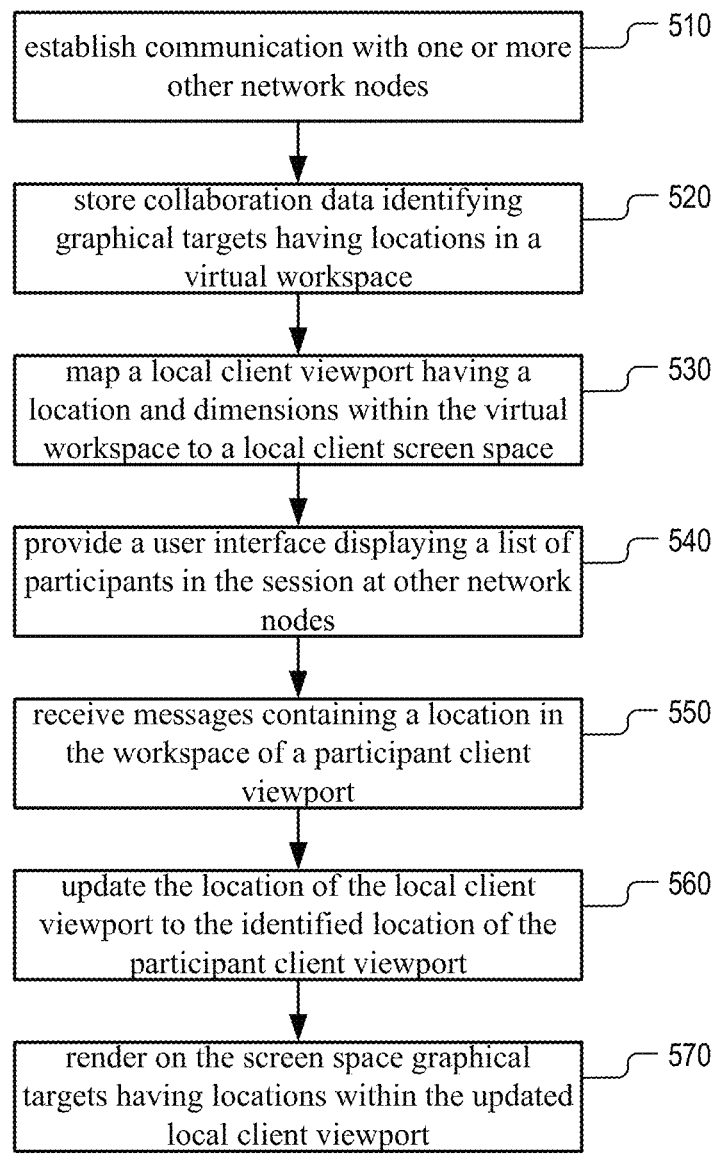
FIG. 5 is a flowchart that illustrates one implementation of a first network node following a second network node.

FIG. 5 is a flowchart that illustrates one implementation of logic executed at a first network node to produce a local viewport that follows the viewport under control of a second network node. The technology disclosed allows a plurality of subject users to follow the activities of a single target client-side network node within a workspace.

FIG. 5 is a simplified flow diagram of a process for interpreting user input executed by a client-side network node. The order illustrated in the simplified flow diagram is provided for the purposes of illustration, and can be modified as suits a particular implementation. Many of the steps, for example, can be executed in parallel. In this implementation, all users in the workspace receive all historic and ephemeral events that occur within that workspace. The workspace can be, in essence, limitless, while a viewport for a client has a specific location and dimensions in the workspace. A plurality of clients can be collaborating within the workspace with overlapping viewports. The clients can receive, and log the events relating to the objects that have coordinates outside of their viewport.

In this example, a first network node establishes communication with one or more other network nodes 510 that are participating in a collaborative workspace. This can include logging in to a session at a server, and communication through the server to the other network nodes, or other communication pathways.

For initialization, the first network node receives collaboration data, such as a spatial event map in the form of a log of the historic events that have occurred within the workspace, or other data structure that identifies the location of graphical objects in the workspace. The first network node also receives, for example as a part of the log of historic events or otherwise, a list of network nodes participating in the session. The first network node can store the collaboration data identifying graphical targets having locations in a virtual workspace used in the workspace session, the collaboration data including locations in a virtual workspace of respective graphical targets 520. As part of this initialization, the first network node can instantiate an initial "vc" (Viewport Change) record, and communicate this record to other participant clients in the workspace. The initial "vc" record can be retrieved from the log from a previous session. The initial "vc" record can also be a default "vc" record within the workspace, or can be instantiated by some other method such logic to identify the most used area of the workspace. The first network node maps the local client viewport having a location and dimensions within the virtual workspace to a local client screen space 530. In order to set the "follow" flag, a first subject user associated with the first network node is provided a user interface displaying a list of participants in the session at other network nodes 540. The first subject user can then select a target user from the list of identified users. The first network node creates a "ve:bf" record, and communicates the record to the participating network nodes of the workspace, which can include the network node of the selected user. The first subject network node is now "following" the selected network node.

The first network node continues to receive messages from other participants in the session, including messages containing a location in the workspace of a participant client viewport 550 in use at the selected other participant client. The first network node only renders those graphical targets that appear within the coordinates of the viewport of the selected user. As the selected other participant client changes the viewport of the selected network node, the first network node can update the location of the local client viewport to the identified location of the participant client viewport in use at the selected other participant client 560.

The first network node can then render on the screen space graphical targets having locations within the updated local client viewport 570.

The technology disclosed can render the contents of the viewport onto the local screen space accounting for possible differences in attributes such as aspect ratio, height, and width of the local screen space. Changes to the virtual workspace, such as the addition, deletion, or modification of graphical targets that intersect the viewport of the selected user are also rendered on the screen space of the first network node.

A third user can also set a follow flag within their network node to follow the first network node, the selected user's network node, or some other network node. At any point, the first user can unset the follow flag and return to their original viewport.

In this example, a plurality of clients within a workspace can be a subject network node or a target network node for the "follow method". In one implementation, a network node can follow multiple targets, and can both follow a target in one viewport as well as collaborate within a second viewport simultaneously.

Figure 6:
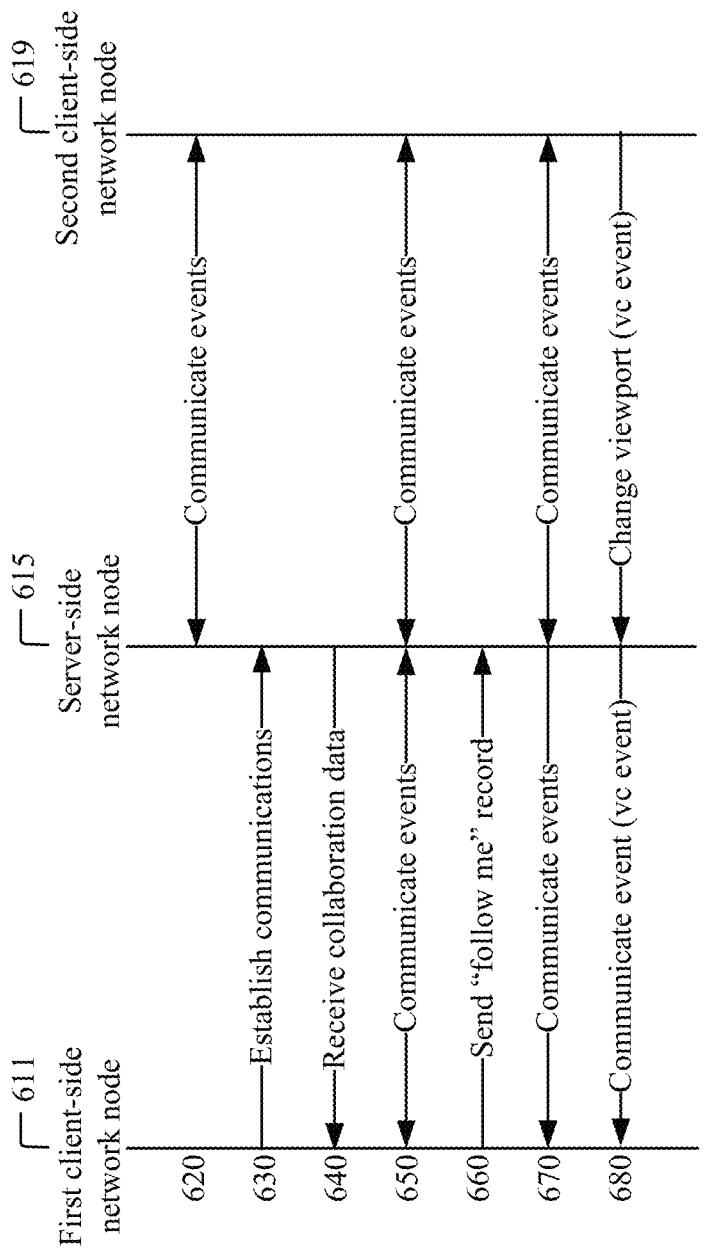
FIG. 6 illustrates a message map between a first client-side network node, a server-side network node, and a second client-side network node for the first client-side network node to follow the second client-side network node.

FIG. 6 illustrates a message map between a first client-side network node, a server-side network node, and a second client-side network node for the first client-side network node to follow the second client-side network node.

Initially, in this implementation, a second client-side network node 619 is participating in a collaborative workspace. The second client-side network node 619 can create events that are shared with other network nodes through a spatial event map on a server-side network node 615. The second client-side network node 619 can also receive events from other client-side network nodes through the server-side network node 615. The transmission of events occurs through a communication of events 620 between one or more client-side network nodes and the server-side network node. The server-side node distributes the events to other participating network nodes in this example.

In this example, the first client-side network node 611 joins the collaborative workspace by establishing communications with the server-side network node 630. The server-side network node sends the collaboration data, including a user list, the viewport change records of the network nodes, the spatial event map, and location markers, to the first client-side network node 640. The first client-side network node then stores the collaboration data to a local log. The first client-side network node 611 sets an initial viewport, as described in FIG. 5, then discovers the event records of graphical targets within the local log that intersect its viewport. The graphical targets that intersect the viewport are then rendered on the screen space.

The first client-side network node 611 and the second client-side network node 619 can both create, transmit, and receive events within the workspace, and can view events that have occurred within their viewports. Events can be communicated to all participating network nodes through the server-side network node 650. The technology disclosed allows a first user to follow a second user. In this example, a first client-side network node 611 can select from the list of users in its local log the identity of a target user working on a second client-side network node 619. This selection causes the first client-side network node to create a begin following "ve:bf" record, which can be communicated to the second client-side network node through the server-side network node 660. Events are still communicated to all participating network nodes. However, the first client-side network node produces a local client viewport that encompasses the viewport specified at the second client-side network node, and only displays those events that intersect the updated local client viewport, and in effect follows the viewport of the second client-side network node. Events can be generated by the second client-side network node 619, or by a third client-side network node not shown in FIG. 6. However, in this example, the first client-side network node 611 does not generate events that change the displayable contents of the workspace while in "follow me" mode, but continues to receive events created by other network nodes 670.

In this example, the second client-side network node 619 can change its viewport. The change in viewport causes the second client-side network node to generate a new viewport change "vc" record, and transmit that record to other participants in the workspace 680. The first client-side network node, while following the second client-side network node, changes its local client viewport to match, then renders the graphical targets from its log that intersects the new local client viewport.

In another viewport finding technology, events that set location markers having locations in the workspace can be shared in a spatial event map, or other kind of collaboration data structure. A first user at a first network node can select a location marker set by any participant at any time. A location marker can be used as a record of where a second user has been, rather than where they are now.

Figure 7A:
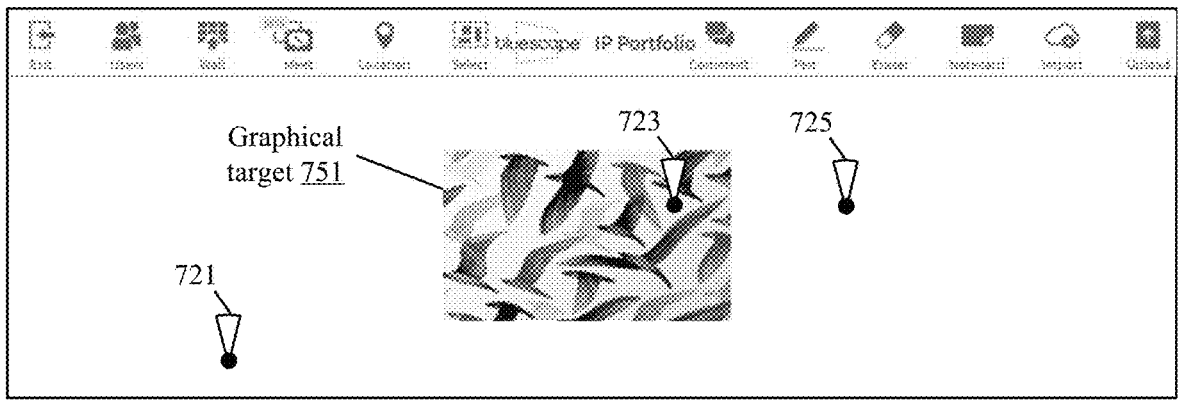
FIGS. 7A, 7B, and 7C (collectively FIG. 7) illustrate examples of a location marker.
Figure 7B:
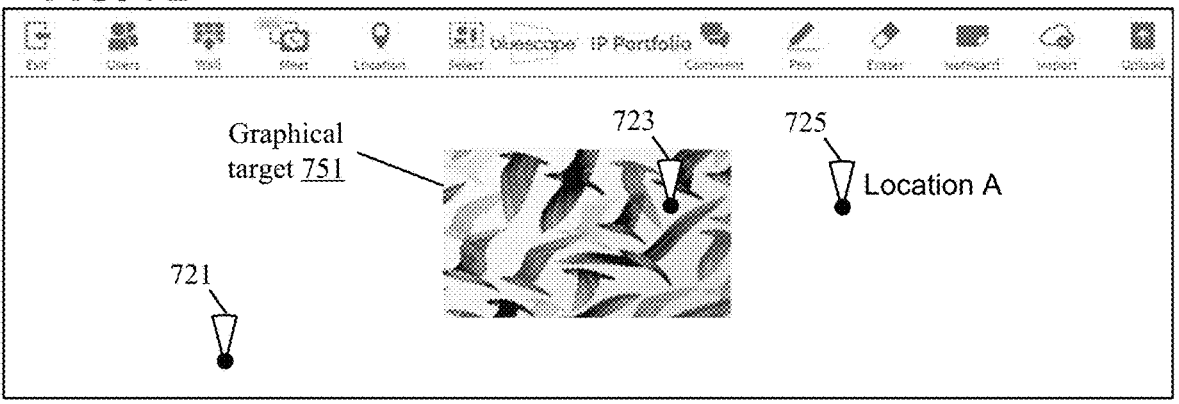
Figure 7C:
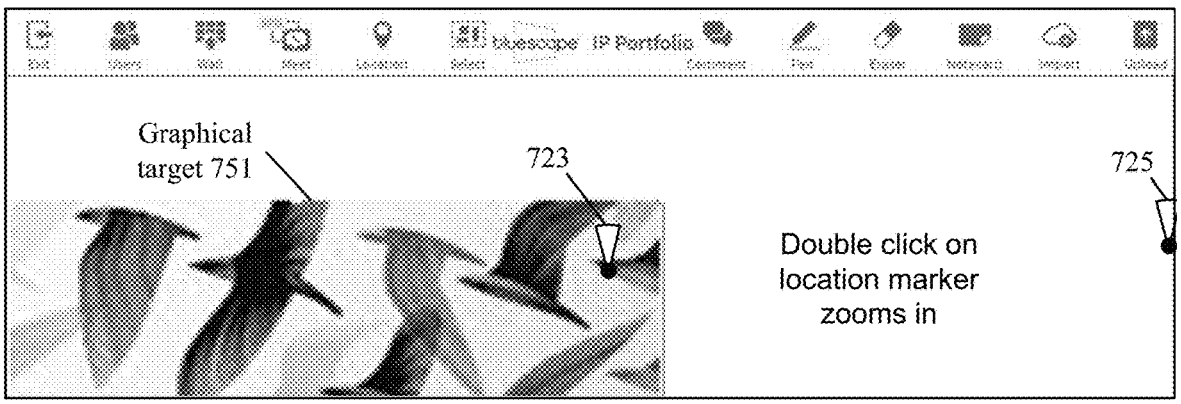

FIGS. 7A, 7B, and 7C illustrate a screen space with examples of a location marker (located within the current viewport of a client), and some of the events that can occur with them. FIG. 7A illustrates a plurality of location markers in a screen space including a first location marker 721, a second location marker 723, a third location marker 725, and a graphical target 751.

FIG. 7B illustrates the objects in FIG. 7A. FIG. 7B also shows the name of the third location marker 725 after a user has clicked one time on the location marker with a mouse, which causes the name of the third location marker to appear. In this example, the name of the location marker 725 is "Location A".

FIG. 7C shows a zoom into the workspace caused by changing the dimensions of the current viewport (with fixed the dimensions of the screen space), with the second location marker 723 becoming the center coordinate (0,0) of the screen space after a pointer or touch based user input gesture, such as for example double click on the second location marker. The double click gesture causes the local client to compute a new viewport specification for the local viewport, centered on the location in the workspace of the double click, which is on the location marker in this example, and having a zoom level increased as a result of the double click. In this example, the name of the third location marker 725 has disappeared, and the viewport dimensions are changed to define a smaller space within the workspace, where the center of the viewport is the location of the double click, i.e. second location marker 723, and the center of the screen space is also the location of the double click. The first location marker 721 is no longer within the viewport, and the graphical target of third location marker 725 is only partially visible within the screen space, where part of the third location marker is outside of the viewport. The viewport no longer contains all of the graphical target 751, but only the portion of the graphical target that fits within the viewport.

Figure 8A:
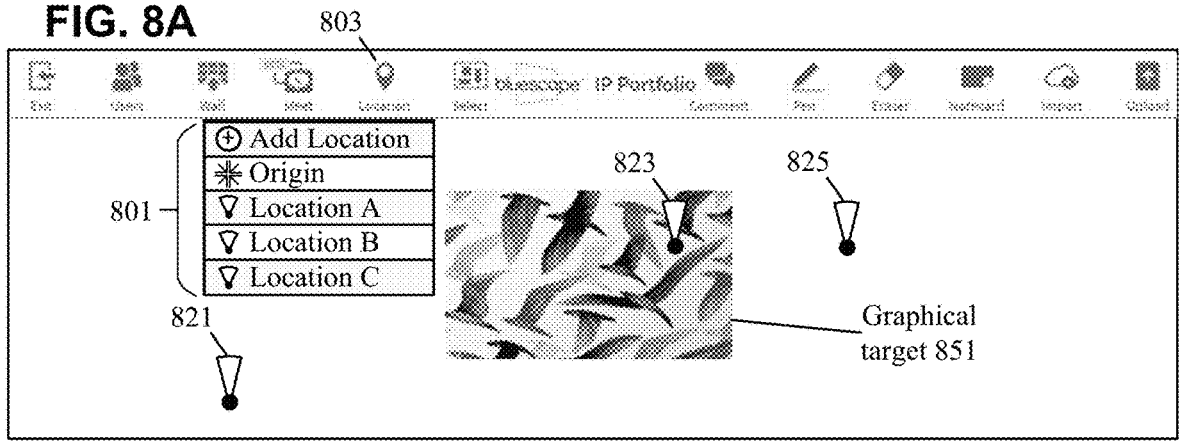
FIGS. 8A and 8B (collectively FIG. 8) illustrate selecting a location marker from a menu.
Figure 8B:
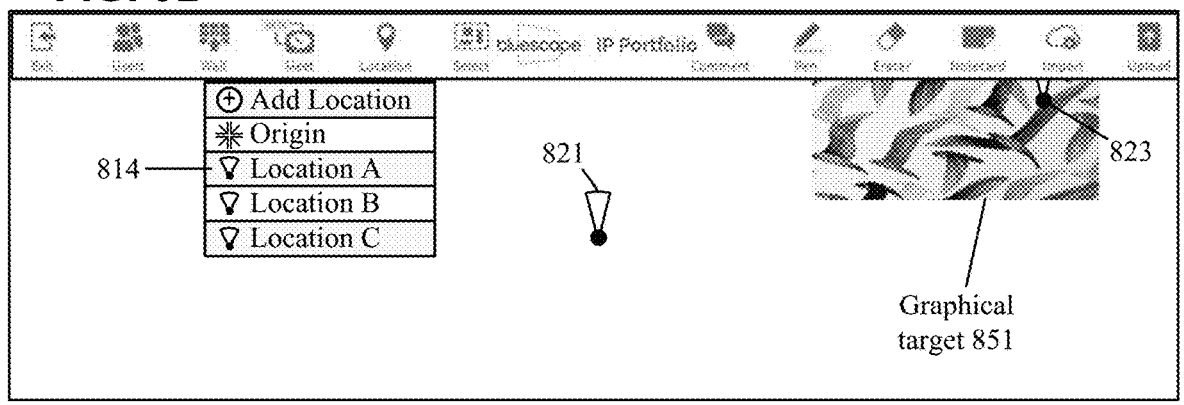

FIGS. 8A and 8B illustrate a graphical user interface having constructs used for selecting a location marker from a menu. FIG. 8A illustrates a plurality of objects including a first location marker 821 for Location A, a second location marker 823 for Location B, a third location marker 825 for Location C, and a graphical target 851. Also illustrated is a location icon 803. Clicking on the location icon 803 in the menu bar causes a location menu 801 to appear, which can have zero or more entries. In this example, the location menu 801 has 5 entries: add a location, change viewport to a preset origin, and three location markers. There can be other location markers in the menu that are not represented in the screen space. Selecting an entry on the menu in this example, as illustrated in FIG. 8B, causes an update to the viewport specifications for the local viewport that in effect results in moving the selected location marker to the center coordinate (e.g. 0,0) of the screen space, while maintaining the zoom level in effect at the time of the selection. This user interface displaying a list of location markers also displays a selectable entry ("origin") for default location or preset origin location for the workspace, in addition to a list of location markers. The client includes logic to update the location of the local client viewport to the default location upon selection of the "origin" selectable entry, while maintaining the zoom level in effect at the time of the selection.

As illustrated in FIG. 8B, within the location menu 801 is a selectable item labeled Location A 814. Selecting Location A 814 causes the viewport to use the first location marker 821 as the center of the viewport, and for the contents of the screen space to appear to move up and to the right. The second location marker 823 and graphical target 851 are now only partially visible in the screen space, and the third location marker 825 is no longer visible within the screen space. In this example, the local client viewport moves in the workspace, without changing size. As a result, zoom level remains constant.

The location marker names are searchable tags that can reflect content of the material having locations in the virtual workspace. In a workspace having large numbers of location markers, the user interface can include search function base on querying the location marker tags.

Figure 9A:
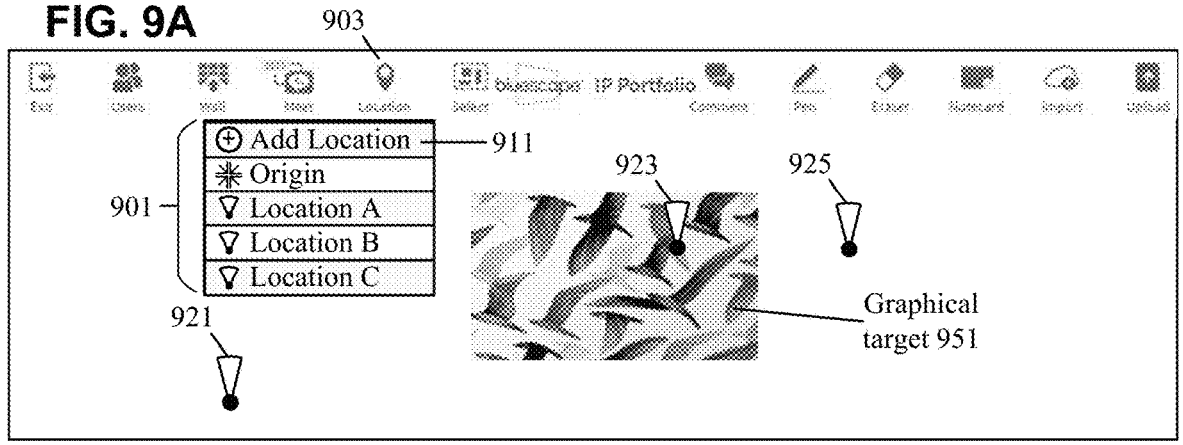
FIGS. 9A, 9B, and 9C (collectively FIG. 9) illustrate an example of adding a location marker to a virtual workspace.
Figure 9B:
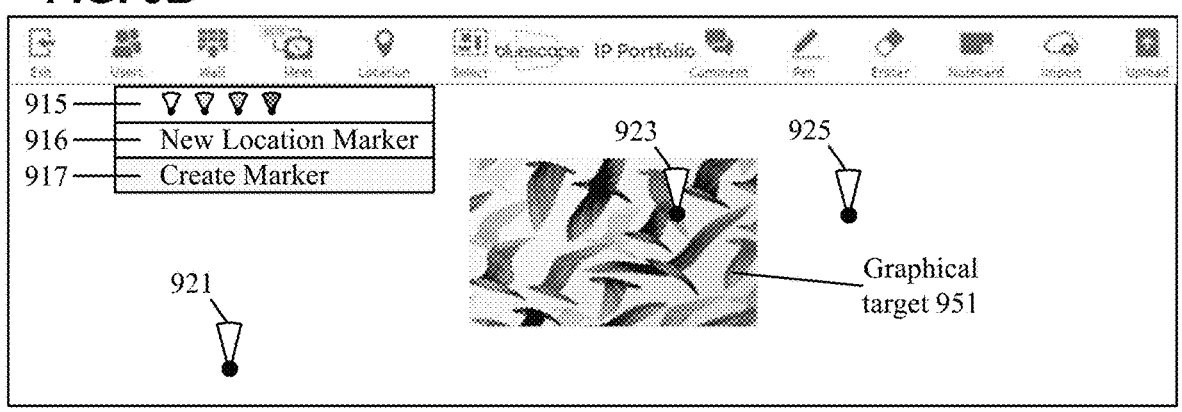
Figure 9C:
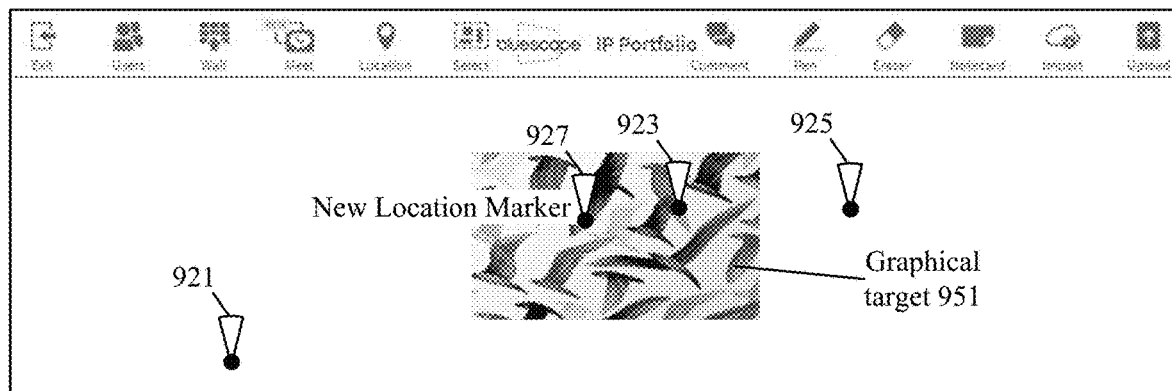

FIGS. 9A, 9B, and 9C illustrate an example of adding a location marker to a virtual workspace. FIG. 9A illustrates a plurality of objects including a first location marker 921, a second location marker 923, a third location marker 925, and a graphical target 951. Also illustrated is a location icon 903 and a location menu 901, which can have zero or more entries. In this example, the first entry in the location menu 901 is Add Location 911. Selecting the Add Location 911 entry can invoke the sub-menu items illustrated in FIG. 9B, which include a location marker type 915 (used to select the graphical target of the create location marker event to be displayed), a field for location marker name 916, and a Create Marker button 917. The creation of a new location marker can include a selection of a marker type 915. In this implementation, the marker types available are color coded to indicate different categories of location markers. A next step is to enter a value in the field for location marker name 916, which, in this example, is "New Location Marker". The final step is to select the Create Marker button 917. As illustrated in FIG. 9C, this selection causes the sub-menu to disappear, and for a new location marker 927 named "New Location Marker" to appear in the middle of the screen space. An "he:markercreate" record is then created and distributed to other participating network nodes:

```
[client-id, "he", new-widget-id, "markercreate",{
    "creationTime":1387565966,
    "name":"New Location Marker",
    "y":1828,
    "x":-875,
    "color":0
}]
```

The client running in the network node that creates a new location marker, includes logic to send messages to other network nodes, the messages identifying events including creation or movement of a location marker. Also, the logic in the client running at the network node, and at other network nodes in the collaboration system, s responsive to receipt of a message carrying the marker create or marker move events from another (second) network node to update the list of location markers.

Figure 10:
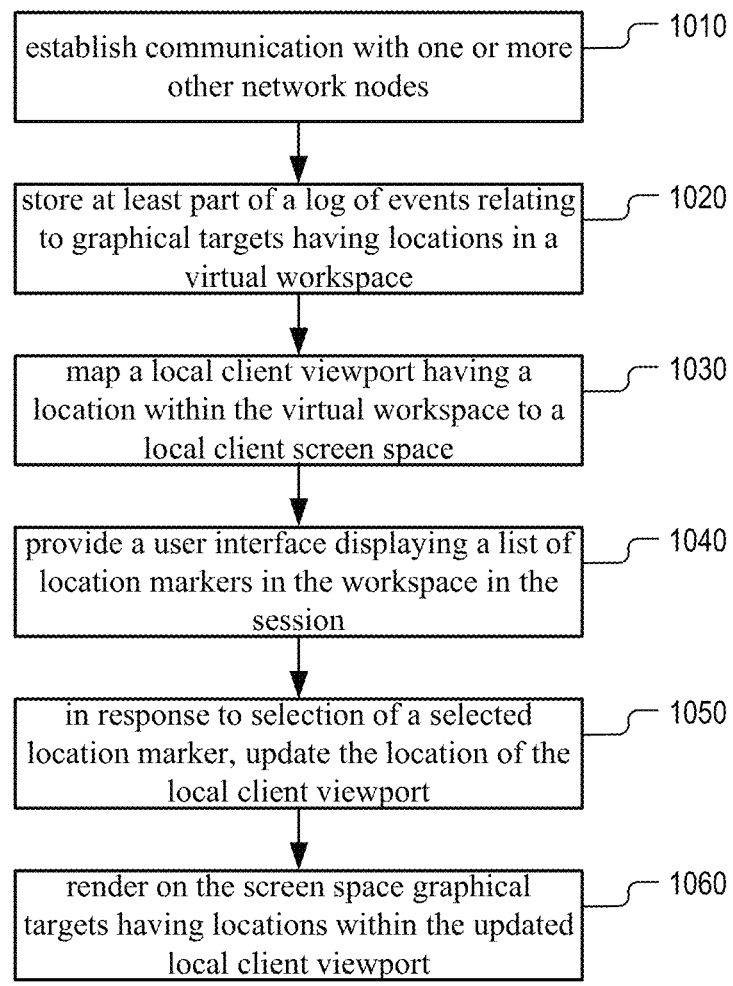
FIG. 10 is a flowchart that illustrates the selection of a location marker from a menu.

FIG. 10 is a flowchart that illustrates the selection of a location marker from a menu. FIG. 10 is a simplified flow diagram of a process for interpreting user input executed by a client-side network node. The order illustrated in the simplified flow diagram is provided for the purposes of illustration, and can be modified as suits a particular implementation. Many of the steps for example, can be executed in parallel. In this implementation, all users in the workspace receive all historic and ephemeral events that occur within that workspace. The workspace can be, in essence, limitless, while a viewport for a client can include the contents of a portion of the workspace that intersects the client's viewport. A plurality of clients can be collaborating within the workspace with overlapping viewports. The clients can receive and log the objects defined by event records that have coordinates outside of their viewport.

In this example, a first network node establishes communication with one or more other network nodes as a participant client in a collaborative workspace session 1010. The first network node stores at least part of a log of events relating to graphical targets, including creation or movement of location markers. The targets of the events have locations in a virtual workspace used in the workspace session, entries in the log including a location in the virtual workspace of a graphical target of an event, an action related to the graphical target, a time of the event, and a target identifier of the graphical target 1020. The first network node maps a local client viewport to a local client screen space in the physical display space at the first network node 1030. The network node provides a user interface displaying a list of location markers in the workspace in the session, a location marker having a marked location in the workspace, and for receiving input indicating a selected location marker from the list 1040.

In response to selection of a selected location marker, the local network node updates the location of the local client viewport to the marked location 1050, and renders on the screen space graphical targets having locations within the updated local client viewport 1060.

Figure 11:
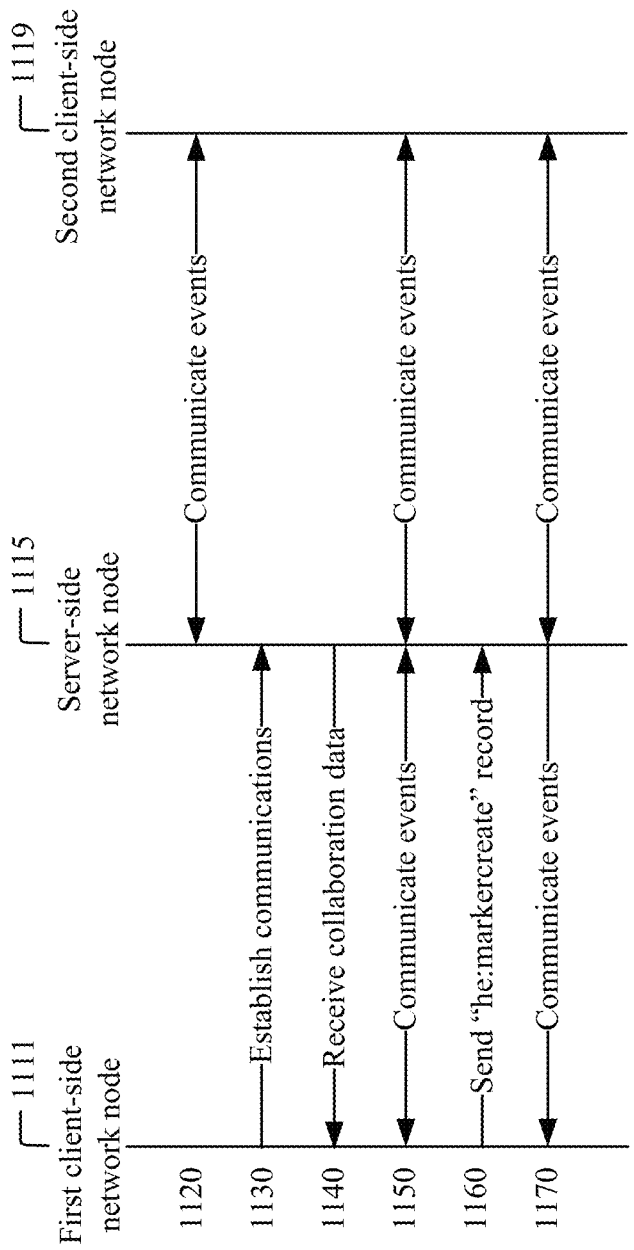
FIG. 11 illustrates a message map for communication of location markers between network nodes.

FIG. 11 illustrates a message map for communication of location markers between network nodes. FIG. 11 illustrates a message map between a first client-side network node, a server-side network node, and a second client-side network node for the first client-side network node to follow the second client-side network node.

Initially, in this implementation, a second client-side network node 1119 is participating in a collaborative workspace. The second client-side network node 1119 can create events that are shared with other network nodes through a spatial event map on a server-side network node 1115. The second client-side network node 1119 can also receive events from other client-side network nodes through the server-side network node 1115. The transmission of events occurs through a communication of events 1120 between one or more client-side network nodes and the server-side network node.

In this example, the first client-side network node 1111 joins the collaborative workspace by establishing communication with the server-side network node 1130. The server-side network node sends the collaboration data, including graphical targets such as location markers, to the first client-side network node 1140. The first client-side network node then stores the collaboration data to a local log. The first client-side network node 1111 sets an initial viewport, as described in FIG. 5, then discovers the event records of graphical targets within the local log that intersect its viewport. The graphical targets of the events that intersect the viewport are then rendered on the screen space.

The first client-side network node 1111 and the second client-side network node 1119 can both create, transmit, and receive events within the workspace, and can view events that have occurred within their viewports. Events can be communicated to all participating network nodes through the server-side network node 1150. The technology disclosed allows a first user to create a location marker that is shared with a second user. In this example, a first client-side network node 1111 can add a location marker, as illustrated in FIG. 9. This causes an "he:markercreate" record to be created, which can be communicated to the second client-side network node through the server-side network node 1160. From that point on, the location marker is communicated to other participants in the workspace 1170 where it can be selected. Upon invoking a location marker, and updating is local viewport as a result, a participant node can send a viewport change "vc" event to the other participants.

Figure 12:
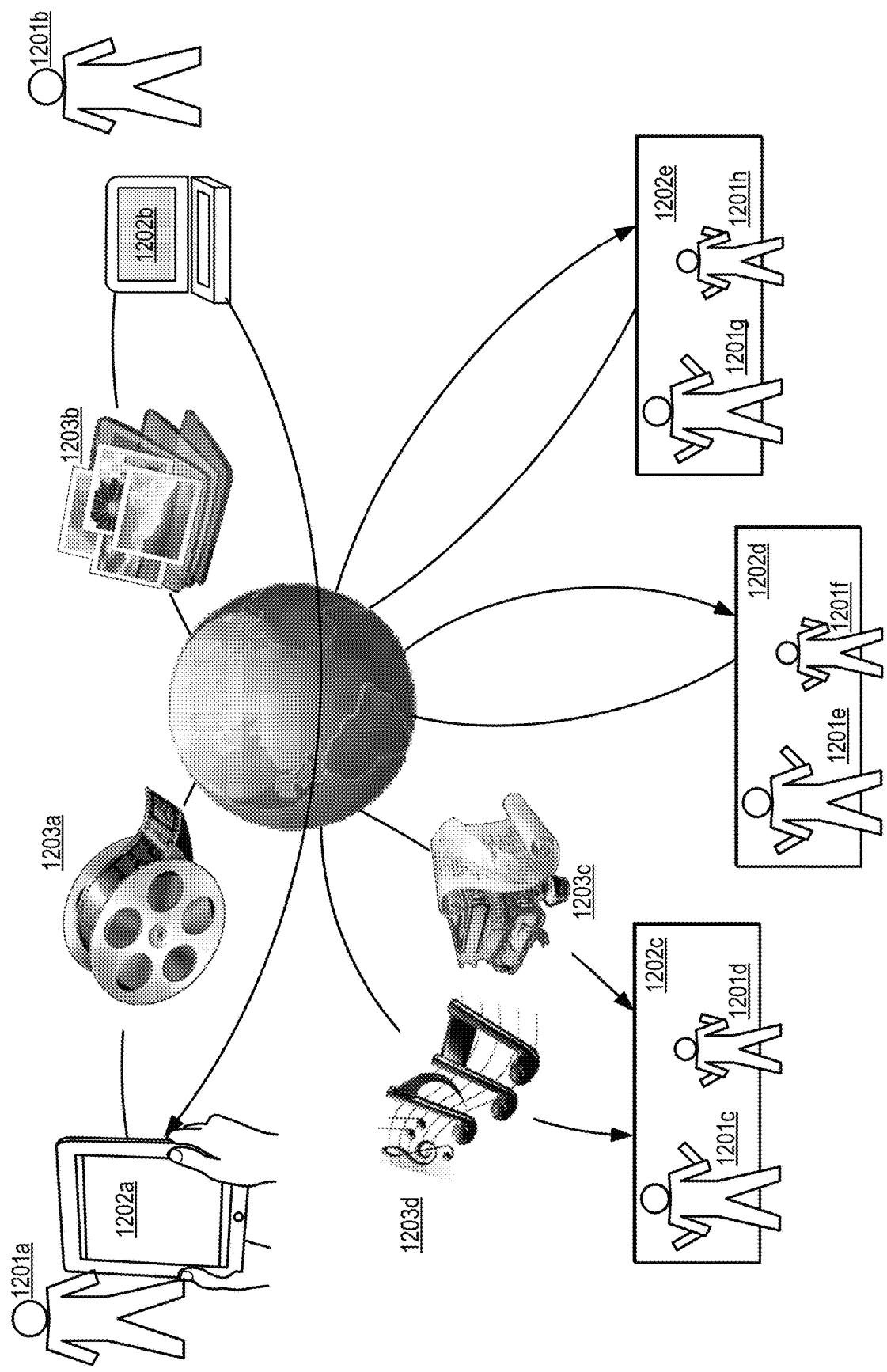
FIG. 12 illustrates example aspects of a digital display collaboration environment.

FIG. 12 illustrates example aspects of a digital display collaboration environment. In the example, a plurality of users 1201*a-h* (collectively 1201) may desire to collaborate with each other in the creation of complex images, music, video, documents, and/or other media, all generally designated in FIG. 12 as 1203*a-d* (collectively 1203). The users in the illustrated example use a variety of devices configured as electronic network nodes, in order to collaborate with each other, for example a tablet 1202*a*, a personal computer (PC) 1202*b*, and many large format displays 1202*c*, 1202*d*, 1202*e* (collectively devices 1202). In the illustrated example the large format display 1202*c*, which is sometimes referred to herein as a "wall", accommodates more than one of the users, (e.g. users 1201*c* and 1201*d*, users 1201*e* and 1201*f*, and users 1201*g* and 1201*h*). The user devices, which are referred to as client-side network nodes, have displays on which a screen space is allocated for displaying events in a workspace. The screen space for a given user may comprise the entire screen of the display, a subset of the screen, a window to be displayed on the screen and so on, such that each has a limited area or extent compared to the virtually unlimited extent of the workspace.

Figure 13:
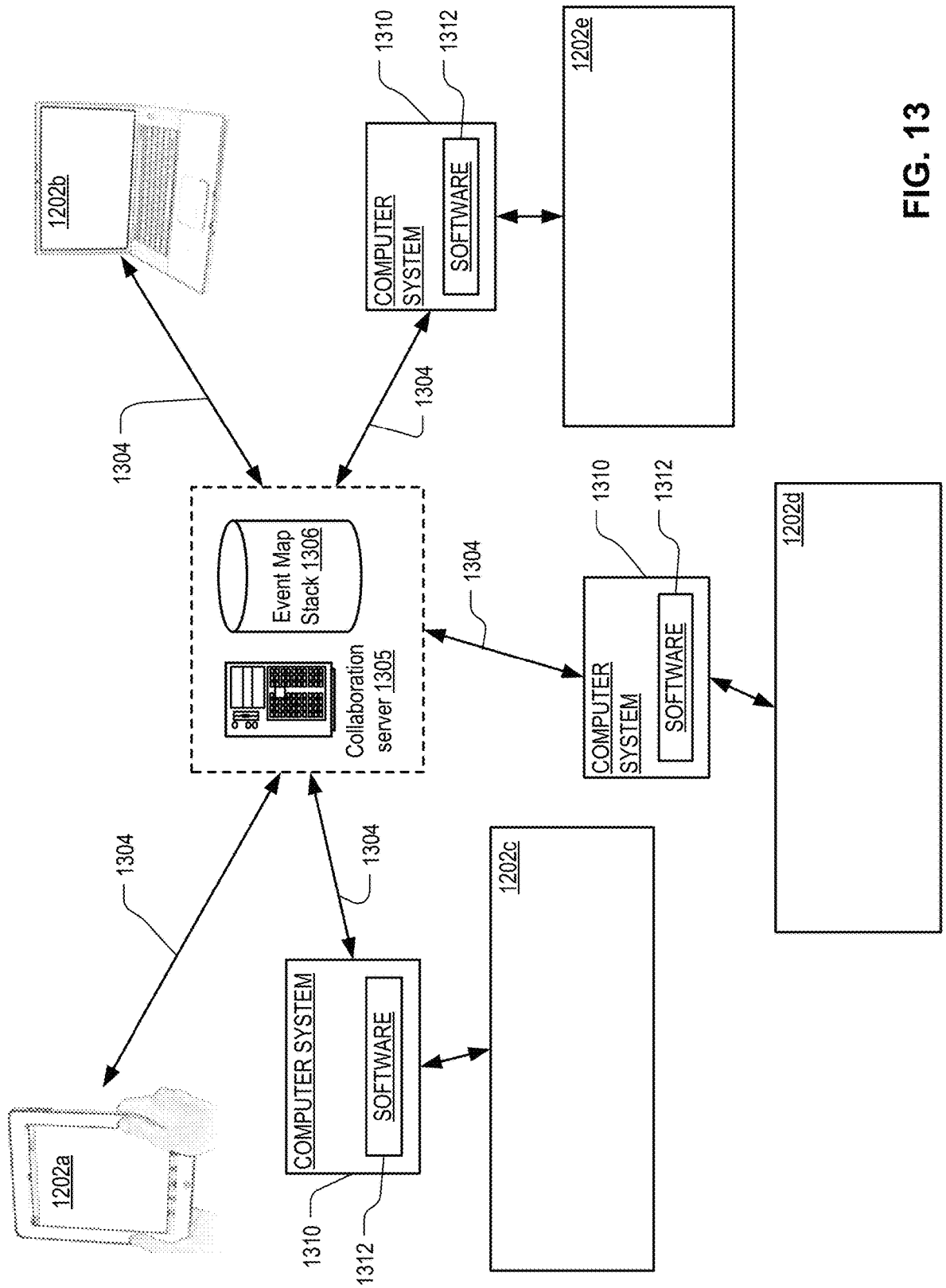
FIG. 13 illustrates additional example aspects of a digital display collaboration environment.

FIG. 13 illustrates additional example aspects of a digital display collaboration environment. As shown in FIG. 12, the large format displays 1202*c*, 1202*d*, 1202*e* sometimes referred to herein as "walls" are controlled by respective client-side, communication networks 1304, which in turn are in network communication with a central collaboration server 1305 configured as a server-side physical network node or nodes, which has accessible thereto a database 1306 storing spatial event map stacks for a plurality of workspaces.

As used herein, a physical network node is an active electronic device that is attached to a network, and is capable of sending, receiving, or forwarding information over a communication channel. Examples of electronic devices which can be deployed as network nodes, include all varieties of computers, workstations, laptop computers, hand held computers and smart phones. As used herein, the term "database" does not necessarily imply any unity of structure. For example, two or more separate databases, when considered together, still constitute a "database" as that term is used herein.

The application running at the collaboration server 1305 can be hosted using Web server software such as Apache or nginx, or a runtime environment such as node.js. It can be hosted for example on virtual machines running operating systems such as LINUX. The server 1305 is illustrated, heuristically, in FIG. 13 as a single computer. However, the server architecture can involve systems of many computers, each running server applications, as is typical for large-scale cloud-based services. The server architecture includes a communication module, which can be configured for various types of communication channels, including more than one channel for each client in a collaboration session. For example, with near-real-time updates across the network, client software can communicate with the server communication module using a message-based channel, based for example on the Web Socket protocol. For file uploads as well as receiving initial large volume workspace data, the client software can communicate with the server communication module via HTTPS. The server can run a front-end program written for example in JavaScript served by Ruby-on-Rails, support authentication/authorization based for example on Oauth, and support coordination among multiple distributed clients. The server communication module can include a message based communication protocol stack, such as a Web Socket application, that performs the functions of recording user actions in workspace data, and relaying user actions to other clients as applicable. This system can run on the node.JS platform for example, or on other server technologies designed to handle high-load socket applications.

The database 1306 stores, for example, a digital representation of workspace data sets for a spatial event map of each session where the workspace data set can include or identify events related to objects displayable on a display canvas. A workspace data set can be implemented in the form of a spatial event stack, managed so that at least persistent spatial events (called historic events) are added to the stack (push) and removed from the stack (pop) in a first-in-last-out pattern during an undo operation. There can be workspace data sets for many different workspaces. A data set for a given workspace can be configured in a database, or as a machine readable document linked to the workspace. The workspace can have unlimited or virtually unlimited dimensions. The workspace data includes event data structures identifying objects displayable by a display client in the display area on a display wall, and associates a time and a location in the workspace with the objects identified by the event data structures. Each device 1202 displays only a portion of the overall workspace. A display wall has a display area for displaying objects, the display area being mapped to a corresponding area in the workspace that corresponds to a viewport in the workspace centered on, or otherwise located with, a user location in the workspace. The mapping of the display area to a corresponding viewport in the workspace is usable by the display client to identify objects in the workspace data within the display area to be rendered on the display, and to identify objects to which to link user touch inputs at positions in the display area on the display.

The server 1305 and database 1306 can constitute a server-side network node, including memory storing a log of events relating to graphical targets having locations in a workspace, entries in the log including a location in the workspace of the graphical target of the event, a time of the event, and a target identifier of the graphical target of the event. The server can include logic to establish links to a plurality of active client-side network nodes, to receive messages identifying events relating to modification and creation of graphical targets having locations in the workspace, to add events to the log in response to said messages, and to distribute messages relating to events identified in messages received from a particular client-side network node to other active client-side network nodes.

The logic in the server 1305 can comprise an application program interface, including a specified set of procedures and parameters, by which to send messages carrying portions of the log to client-side network nodes, and to receive messages from client-side network nodes carrying data identifying events relating to graphical targets having locations in the workspace.

Also, the logic in the server 1305 can include an application interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 1305 can store workspace data sets for a plurality of workspaces, and provide the workspace data to the display clients participating in the session. The workspace data is then used by the computer systems 1310 with appropriate software 1312 including display client software, to determine images to display on the display, and to assign objects for interaction to locations on the display surface. The server 1305 can store and maintain a multitude of workspaces, for different collaboration sessions. Each workspace can be associated with a group of users, and configured for access only by authorized users in the group.

In some alternatives, the server 1305 can keep track of a "viewport" for each device 1202, indicating the portion of the canvas viewable on that device, and can provide to each device 1202 data needed to render the viewport.

Application software running on the client device responsible for rendering drawing objects, handling user inputs, and communicating with the server can be based on HTML5 or other markup based procedures, and run in a browser environment. This allows for easy support of many different client operating system environments.

The user interface data stored in database 1306 includes various types of objects including graphical constructs, such as image bitmaps, video objects, multi-page documents, scalable vector graphics, and the like. The devices 1202 are each in communication with the collaboration server 1305 via a communication network 1304. The communication network 1304 can include all forms of networking components, such as LANs, WANs, routers, switches, WiFi components, cellular components, wired and optical components, and the internet. In one scenario two or more of the users 1201 are located in the same room, and their devices 1202 communicate via WiFi with the collaboration server 1305. In another scenario two or more of the users 1201 are separated from each other by thousands of miles and their devices 1202 communicate with the collaboration server 1305 via the internet. The walls 1202*c*, 1202*d*, 1202*e* can be multi-touch devices which not only display images, but also can sense user gestures provided by touching the display surfaces with either a stylus or a part of the body such as one or more fingers. In some embodiments, a wall (e.g. 1202*c*) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 1202*c* may, for example, be an array of Model No. MT553UTBL MultiTaction Cells, manufactured by Multi-Touch Ltd, Helsinki, Finland, tiled both vertically and horizontally. In order to provide a variety of expressive means, the wall 1202*c* is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area usable as a screen space totaling on the order of 6 feet in height and 30 feet in width, which is wide enough for multiple users to stand at different parts of the wall and manipulate it simultaneously.

FIGS. 14A-14F represent data structures which can be part of workspace data maintained by a database at the collaboration server 1305. In FIG. 14A, an event data structure is illustrated. An event is an interaction with the workspace data that can result in a change in workspace data. Thus, an event can include an event identifier, a timestamp, a session identifier, an event type parameter, the client identifier as client-id, and an array of locations in the workspace, which can include one or more for the corresponding event. It is desirable, for example, that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include style events, which indicate the display parameters of a stroke, for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example. Events can include begin follow events and viewport change events. Events can include marker create events.

Events can be classified as persistent history events and as ephemeral events. Processing of the events for addition to workspace data, and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 14A. A server-side network node includes logic to receive messages carrying ephemeral and history events from client-side network nodes, and to send the ephemeral events to other client-side network nodes without forwarding them to a server at which events are added as corresponding entries in the log, and to send history events to the other client-side network nodes while forwarding them to a server at which events are added as corresponding entries to the log.

FIG. 14B illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 14C illustrates a data structure which consolidates a number of events and objects into a cacheable set called a chunk. The data structure includes a session ID, and identifier of the events included in the chunk, and a timestamp at which the chunk was created.

FIG. 14D illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated.

FIG. 14E illustrates a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

The system can encrypt communications with client-side network nodes, and can encrypt the database in which the spatial event maps are stored. Also, on the client-side network nodes, cached copies of the spatial event map are encrypted in some embodiments, to prevent unauthorized access to the data by intruders who gain access to the client-side computers.

FIG. 14F illustrates a Global Session Activity Table (GSAT) used to map active clients to active workspaces. The data structure includes a workspace name, a device type, a client ID, a session ID, and actor type, and an actor ID.

Figure 15:
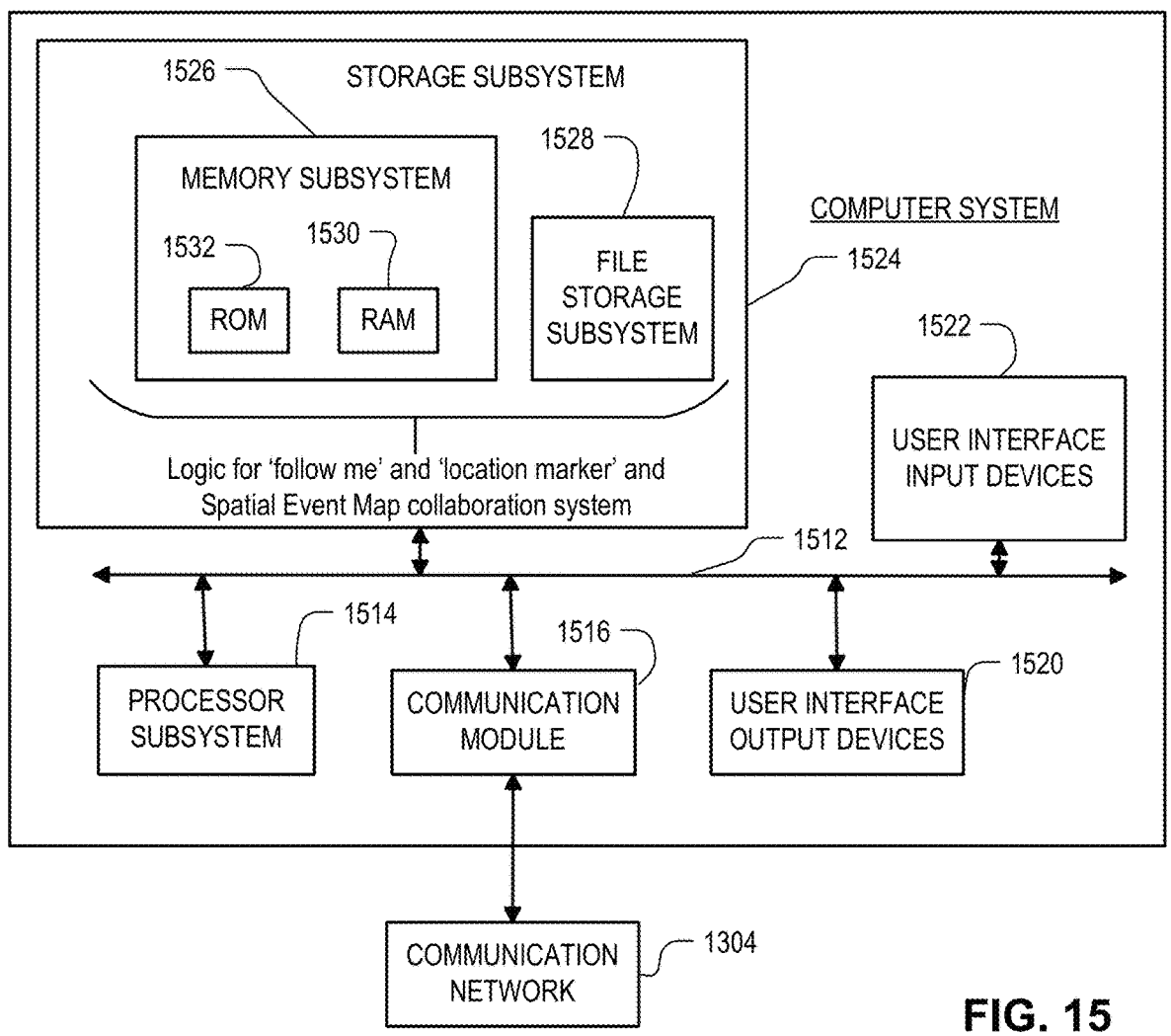
FIG. 15 is a simplified block diagram of a computer system, or network node, which can be used to implement the client-side functions or the server-side functions in a distributed collaboration system.

FIG. 15 is a simplified block diagram of a computer system, or network node, which can be used to implement the client-side functions (e.g. computer system 1310) or the server-side functions (e.g. server 1305) in a distributed collaboration system. A computer system typically includes a processor subsystem 1514 which communicates with a number of peripheral devices via bus subsystem 1512. These peripheral devices may include a storage subsystem 1524, comprising a memory subsystem 1526 and a file storage subsystem 1528, user interface input devices 1522, user interface output devices 1520, and a network interface subsystem within a communication module 1516. The input and output devices allow user interaction with the computer system. Communication module 1516 provides physical and communication protocol support for interfaces to outside networks, including an interface to communication network 1304, and is coupled via communication network 1304 to corresponding communication modules in other computer systems. Communication network 1304 may comprise many interconnected computer systems and communication links. These communication links may be wireline links, optical links, wireless links, or any other mechanisms for communication of information, but typically it is an IP-based communication network, at least at its extremities. While in one embodiment, communication network 1304 is the Internet, in other embodiments, to communication network 1304 may be any suitable computer network.

The physical hardware components of network interfaces are sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 1522 may include a keyboard, pointing devices such as a mouse, trackball, touchpad, or graphics tablet, a scanner, a touch screen incorporated into the display (including the touch sensitive portions of large format digital display 1202c), audio input devices such as voice recognition systems, microphones, and other types of tangible input devices. In general, use of the term "input device" is intended to include all possible types of devices and ways to input information into the computer system or onto communication network 1304.

User interface output devices 1520 may include a display subsystem, a printer, a fax machine, or non-visual displays such as audio output devices. The display subsystem can include a cathode ray tube (CRT), a flat panel device such as a liquid crystal display (LCD), a projection device, or some other mechanism for creating a visible image. In the embodiment of FIG. 12, it includes the display functions of large format digital display 1202c. In general, use of the term "output device" is intended to include all possible types of devices and ways to output information from the computer system to the user or to another machine or computer system.

Storage subsystem 1524 stores the basic programming and data constructs that provide the functionality of certain embodiments of the technology disclosed. The storage subsystem 1524 includes computer program instructions implementing a spatial event map collaboration system client, or a spatial event map collaboration system server, and can include logic for modules such as "follow me" and "location marker".

The storage subsystem 1524 when used for implementation of server side network-nodes, comprises a product including a non-transitory computer readable medium storing a machine readable data structure including a spatial event map which locates events in a workspace, wherein the spatial event map includes a log of events, entries in the log having a location of a graphical target of the event in the workspace and a time. Also, the storage subsystem 1524 comprises a product including executable instructions for performing the procedures described herein associated with the server-side network node.

The storage subsystem 1524 when used for implementation of client side network-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace and a time. Also, the storage subsystem 1524 comprises a product including executable instructions for performing the procedures described herein associated with the client-side network node.

For example, the various modules implementing the functionality of certain embodiments of the technology disclosed may be stored in storage subsystem 1524. These software modules are generally executed by processor subsystem 1514.

Memory subsystem 1526 typically includes a number of memories including a main random access memory (RAM) 1530 for storage of instructions and data during program execution and a read only memory (ROM) 1532 in which fixed instructions are stored. File storage subsystem 1528 provides persistent storage for program and data files, and may include a hard disk drive, a floppy disk drive along with associated removable media, a CD ROM drive, an optical drive, or removable media cartridges. The databases and modules implementing the functionality of certain embodiments of the technology disclosed may have been provided on a computer readable medium such as one or more CD-ROMs, and may be stored by file storage subsystem 1528. The host memory subsystem 1526 contains, among other things, computer instructions which, when executed by the processor subsystem 1514, cause the computer system to operate or perform functions as described herein. As used herein, processes and software that are said to run in or on "the host" or "the computer," execute on the processor subsystem 1514 in response to computer instructions and data in the host memory subsystem 1526 including any other local or remote storage for such instructions and data.

Bus subsystem 1512 provides a mechanism for letting the various components and subsystems of a computer system communicate with each other as intended. Although bus subsystem 1512 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display 1202c. Due to the ever-changing nature of computers and networks, the description of computer system 1310 depicted in FIG. 15 is intended only as a specific example for purposes of illustrating the preferred embodiments of the technology disclosed. Many other configurations of the computer system are possible having more or less components than the computer system depicted in FIG. 15. The same components and variations can also make up each of the other devices 1202 in the collaboration environment of FIG. 13, as well as the collaboration server 1305 and display database 1306.

API

Aspects of an application program interface API supporting use of spatial event maps, with follow me and location marker functions are set out here for the purposes of example of technology to implement the techniques described herein.

Socket Requests Server (Web Sockets)—used for updating clients with relevant data (new strokes, cards, clients, etc.) once connected. Also handles the initial connection handshake.

Service Requests Server (HTTPS/REST)—used for cacheable responses, as well as posting data (i.e. images and cards)

Client-side network nodes are configured according to the API, and include corresponding socket requests clients and service requests clients.

All messages are individual UTF-8 encoded JSON arrays. For example:
[sender-id, message-type, . . . ]
    sender-id the ID of the client sending the message, or "−1" if the message originates with the server. Sender-ids are unique among all clients connected to the server.
    message-type a short code identifying the remaining arguments and the intended action.
Establishing a Connection
    Clients use the Configuration Service to retrieve the configuration information for the environment. The socket server URL is provided by the ws_collaboration_service_address key.
    1) To Open the WebSocket and Join a Specific Workspace
<collaboration_service_address>/<workspaceId>/socket?device=<device>array=<array_name>
    workspaceId (string) the id of the workspace to join
    device (string) a device type. Supported values: wall, other
    array (string) an identifier for multiple screen instances. (optional)
    2) To Join the Lobby
    The lobby allows a client to open a web socket before it knows the specific workspace it will display. The lobby also provides a 5-digit PIN which users can use to send a workspace to the wall from their personal device (desktop/ios).
<collaboration_service_address>/lobby/socket?device=<device>&array=<array_name> device (string) a device type. Supported values: wall, other array (string) an identifier for multiple screen instances. (optional)

3) Server Response

When a client establishes a new web-socket connection with the server, the server first chooses a unique client ID and sends it in an "id" message to the client with the unique client ID.

4) Message Structure

The first element of each message array is a sender-id, specifying the client that originated the message. Sender-ids are unique among all sessions on the server. The id and cr messages sent from the server to the client have their sender-id set to a default value, such as −1. The second element of each message array is a two-character code. This code defines the remaining arguments in the array as well as the intended action. Messages sent with a sender-id of −1 are messages that originate from the server.

Message Types

The following messages types are officially supported. Since Spring 2013 there has been an effort to use he and ve when possible instead of adding new top level message types.

| | | |
|---|---|---|
| 1) | cs | Change Session |
| 2) | echo | Echo |
| 3) | error | Error |
| 4) | id | Client Id |
| 5) | jr | Join Room |
| 6) | rl | Room List |
| 7) | un | Undo |
| 8) | up | User Permissions |
| 9) | vc | Viewport Change |
| 10) | he | History Event |
| 11) | ve | Volatile Event |
| 12) | disconnect | Disconnect |
| 13) | ls | List Streams |
| 14) | bs | Begin Stream |
| 15) | es | End Stream |
| 16) | ss | Stream State |
| 17) | oid | Object Id Reservation |

1) cs Change Session

Inform a client or siblings in a display array that the workspace has changed. The server sends this message to the client when it receives request to send a workspace to a wall.

// server --> client

[sender-id, "cs", workspaceId]

sender-id always −1 (indicating the server initiated the message)

workspaceId (string) is the id of the workspace to switch to 2) echo Echo

Echos an optional body back to the originating client. Used to verify that the socket connection and the server are still healthy.

```
// client --> server
[sender-id, "echo", "foo", "bar"...]
// server --> client
[-1, "echo", "foo", "bar"...]
```

After "echo" the message can take any arguments. They will all be echoed back to the client unaltered if the service and the client's socket connection are healthy. When using the echo message to verify socket health we recommend the following:

Wait at least 5 seconds between echo messages

Require 2 consecutive echo failures before assuming network or server problems

This message was added to the protocol because the current implementation of WebSockets in Chrome and other supported browsers do not correctly change readyState or fire onclose when network connection dies.

3) error Error

Informs clients of an error on the server side.

// server→client

["−1", "error", target-id, message]

target-id the guid for the object in the session that the error affects message a message about the error.

This message is only sent by the server and currently only used when an upload fails during asynchronous processing.

4) id Client Id

The server sends this message when the client connects to the socket. Clients are required to store the assigned client ID for use in subsequent socket requests.

// server --> client

["−1", "id", client-id]

client-id (string) the ID of the newly-joined client 5) jr Join Room

Rooms are communication channels that a client can subscribe to. There can be channels for specific workspaces (sessions), for display arrays, or potentially for other groups of clients. The server repeats/sends messages to all the clients connected to a specific room as events happen in that room. A client joins a room to get messages for that display array or workspace (session). There are several types of join room requests.

General jr

Join any room if you know the id.

// server <-- client

[sender-id, "jr", room-id, [data]]

room-id can contain one of lobby or workspace id data is a wildcard set of arguments, which should be used to initialize the room.

Lobby jr

Joins the lobby channel. Used by clients that wish to keep a web socket open while not displaying a workspace.

// server <-- client

[sender-id, "jr", "lobby"]

Session jr

Joins the room for a specific workspace (session).

// server <-- client

[sender-id, "jr", "session", workspace-id]

workspace-id the id of the workspace (workspace)

Array jr

Joins the room for a specific display array.

```
// server <-- client
[sender-id, "jr", "array", {
  arrayId: "myArrayId",
  x: 0,
  y: 0,
  width: 1920,
  height: 1080
}]
``` arrayId (string) id of the display array x (integer) x offset of this display y (integer) y offset of this display width (integer) width of this display height (integer) height of this display Room Join Response:
    The server responds to successful room join (jr) messages with a room message.
General Room
// server --> client
["−1", "room", [room-id], [databag]]
    room-id contains one of: lobby or workspace
    databag is a room-specific bag of variables:
Lobby Room
// server --> client
["−1", "room", "lobby", {pin: pin-code}]
    pin containing the pin for wall authentication
Session Room
// server --> client
["−1","room","session",{"uid":
    "SU5DVpxbfnyGCesijBou","name":"Dec 16 Release","sharing_link":"https://portal.Bluescape.com/sessions/1357/shares"}]
    'uid' the id of the workspace
    'name' the name of the workspace to show in the client
    'sharing_link' a link to the portal page where a user can share this workspace with others
6) rl Room List
    Informs the client of the room memberships. Room memberships include information regarding clients visiting the same room as you.
// server --> client
["−1", "rl", roomMembershipList]
    roomMembershipList (array of room membership objects)
A room membership object is a hash with the following keys
    name User or device name
    device_type The type of device the user is on, currently wall or other. (Deprecated)
    clientId The clientId of this device
    clientType The type of client (browser, ipad, or wall)
    viewport (optional) If the client provides a viewport rect the server will repeat it to all clients.
7) un Undo
    Undoes the last undo-able action (move, set text, stroke, etc).

```
// server <-- client
[sender-id, "un", region-id]
// server --> client
[client-id, 'undo', target-id, removedEventId]
```

Undo Example: Move a Window and then Undo that Move
    The following example shows a move, and how that move is undone.

```
// Client sends move
["5122895cff31fe3509000001","he","5122898bff31fe3509000002","position",{
  "rect":[257,357,537,517],
  "order":2
}]
// Server response
["5122895cff31fe3509000001","he","5122898bff31fe3509000002","5122898efde0f33509000008","position",{
  "rect":[257,357,537,517]
  ,"order":2
}]
// Client sends undo [<clientId>, 'un', <canvasRegionId>]
["5122895cff31fe3509000001","un",null]
// Server response
// [<clientId>, 'undo', <targetId>, <removedMessageId>]
["−1","undo","5122898bff31fe3509000002","5122898efde0f33509000008"]
```

The server removes the history event from the workspace history and notifies all clients subscribed to the room that this record will no longer be a part of the workspace's historical timeline. Future requests of the history via the HTTP API will not include the undone event (until we implement redo).
    8) Up User Permissions
    Gets the permissions that the current user has for this workspace. Only relevant when a client is acting as an agent for a specific user not relevant when using public key authentication (walls).
// server --> client
[sender-id, "up", permissions]
    Permissions a hash of permission types and true/false to indicate if the authenticated user has that permission. Currently the only permission is "can_share" indicating users who can share the workspace with others.
    9) vc Viewport Change
    Updates other clients in a session that one client's viewport has changed. This is designed to support the "jump to user's view" and "follow me" features. Clients send a viewport change "vc" event upon entering a session for the first time. This ensures that other clients will be able to follow their movements. When processing incoming viewport change "vc" events, clients keep a cache of viewports, keyed by client ID. This is in order to handle occasions where room list membership (rl) events with missing viewports arrive after associated VC events. A change in a target viewport to a revised target viewport can include a change in the size of the viewport in one or the other dimension or both, which does not maintain the aspect ratio of the viewport. A change in a target viewport can also include a change in the page zoom of the viewport. When subject client-side viewports in "jump to user's view" or "follow-me" mode receive a first 'vc' record, it is an instruction for mapping a displayable area of the subject client-side viewport to the area of a target viewport. A subsequent 'vc' record results in a remapped displayable area of the subject client-side viewport to the target viewport. When the "jump to user's view" or "follow me" feature is disabled, the subject client-side viewport returns to its prior window.
// server <--> client
[sender-id, "vc", viewport-rect]
    viewport-rect an array in the form [x1, y1, x2, y2] representing the section of the workspace viewable on the sending client.
    10) He History Event
    History events are pieces of data that are persisted to the database. Any information that is necessary for recreating a visual workspace should be sent to the collaborative service via he messages.

Examples:
    Creation of notes, images, and other widgets
    Moving widgets
    Setting or updating attributes of widgets (e.g. note text, marker locations)
    Deleting widgets
    When the server receives a history event it does the following:
    Assign the event an unique id
    Persist the event to the database
    Broadcast the event, with its id, to all clients connected to the workspace
History Event Basic Message Format
// server <-- client
[client-id, "he", target-id, event-type, event-properties]
    client-id (string) the ID of the originating client
    target-id (string) the ID of the target object/widget/app to which this event is relevant
    event-type (string) an arbitrary event type
    properties (object) a JSON object describing pertinent key/values for the event
        regionId (string) the canvas region identifier if the object is created in a canvas region (optional, will be included if it was included in the history event sent by the client)

All properties included in a message will be stored on the server and echoed back to clients. They will also be included in the history sent over http.
// server --> client
[client-id, "he", target-id, event-id, event-type, event-properties]
    client-id (string) the ID of the originating client
    target-id (string) the ID of the target window to which this event is relevant
    event-id (string) the ID of the event in the database
    event-type (string) an arbitrary event type
    properties (object) a JSON object describing pertinent key/values for the event
        regionId (string) the canvas region identifier if the object is created in a canvas region (optional, will be included if it was included in the history event sent by the client)
Batch History Events
    In order to ensure ordering of tightly coupled events, many can be sent in a batch message by changing the event payload to be an array of event payloads.
// server <-- client
[client-id, "bhe", [event1, event2, event3, event4]]
    In this case, each event is a packet send as a standard web socket history message.
The event structure is:
[targetId, eventType, props]
///
    So, the clientId portion is not repeated, but all else is as a standard event.
Current History Event Types
    create Add a widget to the workspace
    delete Remove the widget from the workspace
    position Update the size or location of the widget in the workspace
    template Change a card template (background color)
    membership Update the target children. Used for groups.
    pin Pin or unpin a widget
    stroke Add a pen or eraser stroke to a widget
    text Sets or update the text and/or text formatting of a note.
    markercreate Creates a location marker
    markermove Moves an existing location marker
    markerdelete Deletes an existing location marker
    tsxappevent Used for creating, deleting, and updating tsx widgets such as web browsers
    navigate Used for navigating to different page inside group documents (MS docs/PDF)

Widgets And History Events Table

|  | note | image | workspace | web browse | location marker | pdf | group | doc |
|---|---|---|---|---|---|---|---|---|
| create | X | X |  |  | * | X | X | X |
| delete | X | X |  |  | * | X | X | X |
| position | X | X |  |  | * | X | X | X |
| template | X |  |  |  |  |  |  |  |
| membership |  |  |  |  |  |  | X |  |
| pin | X | X |  |  |  | X |  | X |
| stroke | X | X | X |  |  |  |  |  |
| text | X |  |  |  |  |  |  |  |
| markercreate |  |  |  |  | X |  |  |  |
| markermove |  |  |  |  | X |  |  |  |
| markerdelete |  |  |  |  | X |  |  |  |
| tsxappevent |  |  |  | X |  |  |  |  |
| navigate |  |  |  |  |  |  |  | X |

* The browser client supports receiving alternative versions of these messages but does not send them out to other clients History Event Details
Comments
    Comments are stored in the history database, but are associated with a particular object rather than a position on the plane.
// client --> server
[client-id, "he", target-id, "create", {
    "id":"5123e7ebcd18d3ef5e000001",
    "type":"comment",
    "text":"text of the comment",
    "parent": "5123 e7ebcd18d3ef5e000000"}]
Server will append 'name' to the body of the comment into the props object. The parent prop is optional and is an id
[client-id, "he", comment-id, "delete"}]
[client-id, "he", comment-id, "text", {"text":"text of the comment"}]
create
    Clients send 'create' to the collaboration server to add a widget to a workspace. For 'create' messages the target-id is the id of the containing element, usually the workspace-id.
Generic Widget Create Example

```
// client --> server
[client-id, "he", workspace-id, "create", {
  "id":"5123e7ebcd18d3ef5e000001",
  "type":"widget",
  "regionId":null
}]
```

Props
  id (string) unique identifier for the widget
  type (string) the type of widget
  regionId (string) the canvas region if the object is created in a canvas region
Most widgets will also have a location property, usually a rect and order, but potentially a point or other representation.

Card Create Example

```
// client --> server
[client-id, "he", workspace-id, "create", {
  "id":"5123e7ebcd18d3ef5e000001",
  "baseName":"sessions/all/Teal",
  "ext":"JPEG",
  "rect":[-1298,-390,-1018,-230],
  "actualWidth":560,
  "actualHeight":320,
  "order":4,
  "type":"note",
  "regionId":null,
  "hidden":false,
  "text":"some text for the note",
  "styles": {
    "font-size" : "42px",
    "font-weight" : "400",
    "text-transform" : "inherit"
  }
}]
```

Props
  id (string) unique identifier for the window
  baseName (string) the background image file name
  ext (string) the background image file extension
  rect (object) the location of the window
  actualWidth (int) the background image width in pixels
  actualHeight (int) the background image height in pixels
  order (int) z order
  type (string) "note" for objects that can have text, "image" for other objects
  regionId (string) the canvas region if the object is created in a canvas region
  hidden (boolean) whether the window is currently hidden
  text (string) the text contained in the note (optional)
  styles (object) style for the text contained in the note (optional)

PDF Create Example

```
// server --> client
[client-id,
"he",
target-id,
event-id,
"create",
{"type":"pdf",
"id":"5307ec25a294d9250bf65fce",
  "assetPath":"sessions/objects/s7t6mNHxfpqWxAYqYXLF/5307ec25a294d9250bf65fce.pdf",
"rect":[1770,284,2994,1076],
"actualWidth": 1224,
"actualHeight": 792,
"filename":"5617_FSPLT1_018078.pdf",
"title":"Record of Decision",
"hidden":false,
"pin":false
"pages":73}]
```

Props
  type (string) "pdf"
  id (string) unique identifier for the pdf
  assetPath (string) the location of this asset on the asset server. Use configuration service to get the asset base path.
  rect (object) the location of the window in the workspace
  actualWidth (int) the width of the widest page in the pdf, combined with actualHeight to build "bounding box"
  actualHeight (int) the height of the tallest page in the pdf, combined with actualWidth to build "bounding box"
  filename (string) the original file name of the pdf
  order (int) z order
  hidden (boolean) whether the window is currently hidden
  pin (boolean) whether the pdf is pinned in one location on the workspace
  regionId (string) the canvas region if the object is created in a canvas region (optional)

Group Create Example

```
// client "-> server
[client"id,
"he" ,
target-id,
"create" ,
{"type" : "group" ,
-id" : "S3aS2b392S8f62fce" ,
-children" : [ ]}]
```

Props
  type (string) "group"
  id (string) unique identifier for the group
  children (array) array of target-ld's of widgets that should be part of the group Generic Group Position Example
//client --> server

[client-id, he, groupid, 'position', {"rect": [0, 0, 0, 0], "order":4}]
    Props
        rect (object) The rect of the group. Specified as x1, y1, x2, y2.
        order (int) the z-order of the target group
Membership
Replaces the target object's children. Used for grouping items.

```
// server <-- client
[client-id, "he", target-id, "membership", {"children" :
  [53a52b39250f62fce, 53a52b39250f62fce]}]
// server --> client
[client-id, "he", target-id, event-id, "membership", {"children" :
  [53a52b39250f62fce, 53a52b39250f62fce]}]
```

Properties
        children (array) Required. An array containing at least one widget ID to include in the group. To remove all children, a delete message should be used instead.
Group Document Create Example

```
// server --> client
[ client-id,
"he",
target-id, // group document id
event-id,
"create",
{
"type":"document",
"rect":[x1,y1,x2,y2]
"maxWidth":123,
"maxHeight":456,
"layout":"stacked",
"title":"title of this document",
"assetURL": "xxx/xxx/xxx.docx",
"hidden": true,
"pin": false,
"activeChildId": "id1838094221",
"children": [
"id0398749123",
"id1838094221",
"id2849239042",
"id3849012830"]}]
```

Properties
        type (string) "groupdocument"
        activeChildId (string) active child Id, such as currently displayed page of PDF/Doc
        children (array) array of child(page) object IDs, array order represents the child(page) order.
        layout (string) Define the client layout to render this group document.
Presentation Create Example

```
// client --> server
[client-id,
"he",
target-id,
"create",
{ "type":"presentation",
"id":"53a52b39250f62fce",
"children": [ ]}]
```

Props
    type (string) "presentation"
    id (string) unique identifier for the group
    children (array) array of target-id's of widgets that should part of the presentation in order of presentation Presentation Create Example

```
// server --> client
[ client-id,
"he",
target-id, // presentation id
event-id,
"create",
{
"type":"presentation",
"children": [
"id0398749123",
"id1838094221",
"id2849239042",
"id3849012830"]}]
```

Props
        type (string) "presentation"
        children (array) array of child(page) object IDs, array order represents the child(page) order.
Delete
    Removes a widget from a workspace.

```
// server <-- client
[client-id, "he", target-id, "delete", {"hidden":true}]
// server --> client
[client-id, "he", target-id, event-id, "delete", {"hidden":true}]
```

Position
Used to save the position of a widget after a move, fling, resize, etc
Generic Widget Position Example

```
// server <-- client
[client-id, "he", target-id, "position", {new-position}]
// server --> client
[client-id, "he", target-id, event-id, "position", {new-position}]
```

Props
        new-position (object) some way to represent the new position of the object. See the window example.
Generic Window Position Example

```
// server <-- client
[client-id, "he", target-id, "position",
{"rect":[-1298,-390,-1018,-230],"order":4}]
// server --> client
[client-id, "he", target-id, event-id, "position",
{"rect":[-1298,-390,-1018,-230],"order":4}]
```

Props
        rect (object) the location of the target window. Specified as x1, y1, x2, y2
        order (int) the z-order of the target window
template
    Used to change the template for a note. This allows changing the background color.
Note Template Example
// server --> client
[client-id, "he", workspace-id, event-id, "template", {"baseName": "sessions/all/Beige"}]
    Props
        baseName (string) the file name of the new background. The file must be already on the collaboration server. The list of templates is available via the http-protocol at/card_templates.json Used to pin a widget and prevent users from moving or resizing that widget. Also used to remove an existing pin.
Generic Widget Position Example

```
// server --> client
[client-id, "he", workspace-id, event-id, "pin", {"pin": true}]
```

Props
    pin (boolean) true is pin, false is un-pin

Stroke

Used to add a stroke to a widget or to the workspace background.
Generic Stroke Example

```
// server <-- client
[client-id, "he", target-id, "stroke", {
  "size": 10,
  "brush": 1,
  "color": [255, 153, 0, 1],
  "locs": [850, 616, 844, 617],
  "regionId": 59.1
}]
// server --> client
[client-id, "he", target-id, event-id, "stroke", {
  "size": 10,
  "brush": 1,
  "color": [255, 153, 0, 1],
  "locs": [850, 616, 844, 617],
  "regionId": 59.1
}]
```

Props
    size (integer) diameter of the stroke using the coordinate space of the containing object. Strokes on the canvas are sized in world space, while strokes on widgets are sized in their parent widget space.
    brush (integer) the brush type to use when rendering the stroke. 1 is the draw brush, while 2 is the erase brush.
    color (numbers) r/g/b/a values for the color of the stroke. Ignored for erase strokes (although may still be present).
    locs (array) stroke locations in the format: [10, 1, 10, 2, 12, 3] where coordinates are paired [x, y, x, y, x, y, . . . ] in an array. Similar to size, locations are in the coordinate space of the containing object.
    regionId (string) the canvas region if the stroke is created in a canvas region (optional).

Rendering note: strokes should be rendered with end caps centered on the first and last points of the stroke. The end cap's diameter should be equal to the brush size. Rendering end caps is the responsibility of each client.

Text

Set the text and style of text on a widget. Both the text attribute and style attribute are optional.
Generic Text Example

```
// server <-- client
[client-id, "he", target-id, "text", {
  "text" : "abcdef",
  "styles" : {"font-size" : "42px","font-weight" : "400","text-transform" : "inherit"}
}]
// server --> client
[client-id, "he", target-id, event-id, "text", {
  "text" : "abcdef",
  "styles" : {
    "font-size" : "42px",
    "font-weight" : "400",
    "text-transform" : "inherit"
  }
}]
```

Props
    text (string) the text string to show on the widget
    styles (hash) the css styles to apply to the text Markercreate Creates a location marker (map marker, waypoint) at a specific place in the workspace
Example

```
// server <-- client
[client-id, "he", new-widget-id, "markercreate",{
  "creationTime":1387565966,
  "name":"my marker",
  "y":1828,
  "x":-875,
  "color":0
}]
// server --> client
[client-id, "he", new-widget-id, event-id, "markercreate",{
  "creationTime":1387565966,
  "name":"my marker",
  "y":1828,
  "x":-875,
  "color":0
}]
```

Props
    creationTime (int) the creation time (unix time)
    name (string) a label for the location marker
    y (number) the y location of the marker
    x (number) the x location of the marker
    template (string) the marker template name
Alternative Form Accepted by Browser Client

```
// server <-- client
[client-id, "he", session-id, "create",{
  "id":"52b0f86ac55697ad30003b21"
  "type":"locationMarker",
  "creationTime":1387565966,
  "name":"my marker",
  "y":1828,
  "x":-875,
  "template":"red"
}]
// server --> client
[client-id, "he", session-id, event-id, "create",{
  "id":"52b0f86ac55697ad30003b21"
  "type":"locationMarker",
  "creationTime":1387565966,
  "name":"my marker",
  "y":1828,
  "x":-875,
  "template":"red"
}]
```

Markermove

Moves an existing location marker (map marker, waypoint) to a new place in the workspace.
Example

```
// server <-- client
[client-id, "he", marker-id, "markermove",{
  "y":1828,
  "x":-875,
}]
// server --> client
[client-id, "he", marker-id, event-id, "markermove",{
```

```
        "y":1828,
        "x":-875,
    }]
```

Props y (number) the y location of the marker x (number) the x location of the marker Alternative Form Accepted by Browser Client

```
// server <-- client
[client-id, "he", target-id, "position",{
    "y":1828,
    "x":-875,
}]
// server --> client
[client-id, "he", target-id, event-id, "position",{
    "y":1828,
    "x":-875,
}]
```

Markerdelete

Delete an existing location marker.

Example

```
// server <-- client
[client-id, "he", marker-id, "markerdelete",{ }]
// server --> client
[client-id, "he", marker-id, event-id, "markerdelete",{ }]
Alternative form accepted by browser client
// server <-- client
[client-id, "he", target-id, "delete",{
    "hidden":true,
}]
// server --> client
[client-id, "he", target-id, event-id, "delete",{
    "hidden":true,
}]
``` tsxappevent

TSXappevent sends a history event to various widgets on the tsx system.

Example

```
// server <-- client
[client-id, "he", target-id, "tsxappevent",{
    "payload":
    {additional-properties
    },
    "messageType":message-type,
    "targetTsxAppId":tsx-app-id
}]
// server --> client
[client-id, "he", target-id, event-id, "tsxappevent",{
    "payload":
    {
    additional-properties
    },
    "messageType":message-type,
    "targetTsxAppId":tsx-app-id
}]
```

Props payload (object) the properties necessary for this tsxappevent messageType (string) the type of message Example of Creating a Web Browser

```
// server <-- client
[client-id,"he",new-browser-id,"tsxappevent",{
    "payload": {
    "y":709,
    "x":1517,
    "worldSpaceWidth":800,
    "worldSpaceHeight":600,
    "windowSpaceWidth":800,
    "windowSpaceHeight":600,
    "version":1,
    "url":"http://www.google.com/",
    "order":735880
    },
    "messageType":"createBrowser",
    "targetTsxAppId":"webbrowser"
}]
// server --> client
[client-id,"he",new-browser-id, event-id, "tsxappevent", {
    "payload": {
    "y":709,
    "x":1517,
    "worldSpaceWidth":800,
    "worldSpaceHeight":600,
    "windowSpaceWidth":800,
    "windowSpaceHeight":600,
    "version":1,
    "url":"http://www.google.com/",
    "order":735880
    },
    "messageType":"createBrowser",
    "targetTsxAppId":"webbrowser"
}]
```

Props payload (object) details needed for creating a browser x (number) the x location of the marker y (number) the y location of the marker worldSpaceWidth (number) the width in world space worldSpaceHeight (number) the height in world space windowSpaceWidth (number) the width in window space windowSpaceHeight (number) the height in window space version (number) # TODO url (number) the url this browser widget should point to messageType *(string) "createBrowser" for creating browsers targetTsxAppId *(string) "webbrowser" for web browser widgets Example of Deleting a Web Browser

```
// client --> server
[client-id,"he",target-id, "tsxappevent",{
    "messageType":"deleteBrowser",
    "targetTsxAppId":"webbrowser",
    "payload":{"version":1}
}]
```

Navigate

Example of navigating to different item in the payload. One could use this for example for a browser widget navigating to an URL

```
[
client-id,
"he",
target-id, //Group/presentation or maybe Browser URL ID
"navigate",
payload // navigate to this page
]
```

11) ve Volatile Event

Volatile events are not recorded in the database, so they are good for in-progress streaming events like dragging a card around the screen, and once the user lifts their finger, a HistoryEvent is used to record its final place.

Volatile Event Basic Message Format

// server <--> client

[client-id, "ve", target-id, event-type, event-properties]
    client-id (string) the ID of the originating client
    target-id (string) the ID of the target window to which this event is relevant
    event-type (string) an arbitrary event type
    properties (object) a JSON object describing pertinent key/values for the event Current Volatile Event Types
    sb Begins a new stroke.
    sc Continues a previously started stroke.
    se Ends a stroke
    position Used to share a position with other clients that should not be persisted. For example show a window being dragged in real time.
    bf Begin Follow: User A begins to follow User B. Used to notify User A that user B is following.
    ef End Follow: User B is no longer following user A. Used to notify user A that user B is no longer following.
///

| Volatile events by Widget type | | | |
|---|---|---|---|
|  | card | image | Workspace |
| sb | X | X | X |
| sc | X | X | X |
| se | X | X | X |
| position | X | X |  |
| bf |  |  | X |
| ef |  |  | X |

Workspace
    sb Starts a stroke. Used to render strokes on one client while they are being drawn on another client.
    sc Continues a previously started stroke by giving another point to include. Used to render strokes while they are being drawn on another client.
    se Ends a previously started stroke.
    bf Begin Follow: User A begins to follow User B. Used to notify User A that user B is following.
    ef End Follow: User B is no longer following user A. Used to notify user A that user B is no longer following.

Note
    position Live updates the position of a note while its being moved by another user.
    sb Starts a stroke. Used to render strokes on one client while they are being drawn on another client.
    sc Continues a previously started stroke by giving another point to include. Used to render strokes while they are being drawn on another client.
    se Ends a previously started stroke.

Image
    position Live updates the position of an image while its being moved by another user.
    sb Starts a stroke. Used to render strokes on one client while they are being drawn on another client.
    sc Continues a previously started stroke by giving another point to include. Used to render strokes while they are being drawn on another client.
    se Ends a previously started stroke.

Volatile Event Details

The following fields are properties of several volatile events.
    stroke-id Stroke-IDs are selected by the client. Currently they are the sender-id composed with an increasing integer, separated by a dot. This is to make it unique within the server context among all clients.
    target-id A stroke may be attached to a specific target (container) in the workspace. In the case of a stroke belonging to a widget, the target ID field would contain the ID of the widget. Strokes destined for the main canvas in the workspace are designated by having their target ID be the same as the workspace id.

Position—ve

Used to broadcast intermediate steps of a window moving around the workspace.

Generic Position Example

// server <--> client

[client-id, "ve", target-id, "position", {position-info}]
    Props
        position-info—information about the widget's new position Window Position Example // server <--> client

[client-id, "ve", target-id, "position", {"rect":[−1298,−390,−1018,−230],"order":4}]
    Props
        rect (object) the location of the target window
        order (int) the z-order of the target window sb Used to broadcast the beginning of a stroke to the other clients.

```
// server <--> client
[client-id, "ve", target-id, "sb",{
  "brush":1,
  "size":2,
  "color":[214,0,17,1],
  "x":100,
  "y":300,
  "strokeId":"395523d316e942b496a2c8a6fe5f2cac"
}]
```

Props
    x,y (int) the starting point of this stroke
    strokeId (string) the ID of the new stroke sc:
Continues the stroke specified by the stroke id.

// server <--> client

[client-id, "ve", target-id, "sc", {"x":100, "y":300, "strokeId": "395523 d316e942b496a2c8a6fe5f2cac" }]
    Props
        x,y (int) the new end-point of the stroke
        strokeId (string) the ID of the new stroke se:
Ends the stroke specified by stroke-id.

// server <--> client

[client-id, "ve", target-id, "se", {"strokeId": "395523d316e942b496a2c8a6fe5f2cac"}]
    stroke-id (string) the ID of the continued stroke bf:
Begin Follow: User A begins to follow User B. Used to notify User A that user B is following. For this global volatile event, the target ID is the session id. The user being followed will update the UI to indicate that user B is following.

```
// server <--> client
[follower-client-id, "ve", session-id, "bf",
    {"clientId": "395523 d316e942b496a2c8a6fe5f2cac"}]
Props
    clientId (string) the ID of the client being followed
ef:
```
End Follow: User B is no longer following user A. Used to notify user A that user B is no longer following. For this global volatile event, the target ID is the session id. The user being followed will update the UI to indicate that user B is no longer following. If user B leaves the session, user A will receive a room list message which does not contain user B. User A's room list will then be rebuilt, no longer showing user B as a follower.
```
// server <--> client
[follower-client-id, "ve", session-id, "ef",
    {"clientId": "395523 d316e942b496a2c8a6fe5f2cac"}]
Props
    clientId (string) the ID of the client no longer being
        followed
```
Example Interaction: Moving Objects A good example illustrating some of the HistoryEvent/VolatileEvent-related changes is moving an object. While the object is being moved/resized by dragging, a series of volatile events (VEs) is sent to the server, and re-broadcast to all clients subscribed to the workspace:

```
// client sends the following volatile events during the move
// client->server format is: [<clientId>, <messageType>, <targetId>,
        <eventType>, <messageProperties>]
["511d6d429b4aee0000000003","ve","511d6f9c9b4aee0000000039",
    "position",{"rect":[-493,73,-2,565],
    "order":0
}]
["511d6d429b4aee0000000003","ve","511d6f9c9b4aee0000000039",
    "position",{"rect":[-493,73,-2,565],
    "order":0
}]
["511d6d429b4aee0000000003","ve","511d6f9c9b4aee0000000039",
    "position",{"rect":[-538,91,-47,583],
    "order":0
}]
["511d6d429b4aee0000000003","ve","511d6f9c9b4aee0000000039",
    "position",{"rect":[-538,91,-47,583],
    "order":0
}]
```

Once the user finishes moving the object, the client should send a history event is sent to specify the rect and order of the object:

```
["511d6d429b4aee0000000003","he","511d6f9c9b4aee0000000039",
    "position",{"rect":[-492,73,-1,565],
    "order":0
}]
```

The server will respond with the newly persisted he record. Note the inclusion of the record's eventId.

```
// server-> client format of 'he' is: [<clientId>, <messageType>,
<targetId>, <eventId>,
//              <eventType>, <messageProps>]
["511d6d429b4aee0000000003","he","511d6f9c9b4aee0000000039",
    "511d9165c422330000000253","position",{
    "rect":[-492,73,-1,565],
    "order":0
}]
```

Note: The eventId will also be included in history that is fetched via the HTTP API.

12) Disconnect Disconnect

Inform other app instances opened by the same user to close their connection and cease reconnect attempts. This is consumed by browser clients in order to prevent the "frantic reconnect" problem seen when two tabs are opened with the same workspace.
```
// server --> client
[-1, "disconnect"]
```

13) ls List Streams

Inform a client of the current streams in a list. Triggered by other events, similar to a room list.
```
// server --> client
[send-id, "ls", [Stream List for Session]]
    sender-id always -1 (indicating the server initiated the
        message)
```
Stream list is an array of objects, each of which contains the following fields:
    sessionId (string) is the id of the workspace containing the conference
    conferenceId (string) the id of the conference session all users in this workspace connect to
    clientId (Object ID) the ID of the client broadcasting this particular stream
    streamId (string) the ID of this particular AV stream 14) bs Begin Stream Informs the server of a new AV stream starting. The server responds with a List Streams message.
```
// server <-- client
[sender-id, "bs", conferenceId, conferenceProvider, streamId, streamType]
    sender-id clientID of the user starting the stream
    conferenceId (string) the id of the conference session all users in this workspace connect to
    conferenceProvider (string) the type of conference, tokbox or twilio for example
    streamId (string) the ID of this particular AV stream
    streamType (string) audio, video or screenshare
```

15) es End Stream

Informs the server of a new AV stream ending. The server responds with a List Streams message.
```
// server <-- client
[sender-id, "es", conferenceId, streamId]
    sender-id clientID of the user starting the stream
    conferenceId (string) the id of the conference session all users in this workspace connect to
    streamId (string) the ID of this particular AV stream
```

16) ss Stream State

Informs the server of an existing AV stream changing state. The server responds with a List Streams message.
```
// server <-- client
[sender-id, "ss", streamId, streamType]
    sender-id clientID of the user starting the stream
    streamId (string) the ID of this particular AV stream
    streamType (string) audio, video or screenshare
```

17) oid Object ID Reservation

Use this to create a new unique object id that is acceptable for creating new history events which create an object.
'''javascript
```
// server <-- client
[sender-id, "oid"]
```
Server Responds with:
```
// server --> client
["-1", 'oid', <new-object-id>]
```

The API described above provides one example message structure. Other structures may be utilized as well, as suits a particular implementation.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also, as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the technology disclosed may consist of any such feature or combination of features. In view of the foregoing description it will be evident to a person skilled in the art that various modifications may be made within the scope of the technology disclosed.

The foregoing description of preferred embodiments of the technology disclosed has been provided for the purposes of illustration and description. It is not intended to be exhaustive or to limit the technology disclosed to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology disclosed. In addition, any and all variations described, suggested or incorporated by reference herein with respect to any one embodiment are also to be considered taught with respect to all other embodiments. The embodiments described herein were chosen and described in order to best explain the principles of the technology disclosed and its practical application, thereby enabling others skilled in the art to understand the technology disclosed for various embodiments and with various modifications as are suited to the particular use contemplated. It is intended that the scope of the technology disclosed be defined by the following claims and their equivalents.

As with all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology disclosed, and it will be understood that numerous additional steps for accomplishing other functions can be performed before, after and between those shown.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. It is contemplated that technologies described herein can be implemented using collaboration data structures other that the spatial event map.

What is claimed is:

1. For use in a collaboration system, a first network node comprising:
    a display having a physical display space, a user input device, a processor and a communication port, the processor being configured with logic to:
        establish communication with one or more other network nodes;
        store collaboration data identifying graphical targets having locations in a virtual workspace, the collaboration data including (i) locations in the virtual workspace of the identified graphical targets and (ii) a log of events relating to the graphical targets having locations in the workspace and including entries of a viewport change event comprising a remote client viewport's specification of dimensions to be displayed on a local client viewport, wherein the remote client viewport and local client viewports are viewports of different or overlapping areas of the virtual workspace;
        compute a mapping of the local client viewport having a location and dimensions in the virtual workspace to a local client screen space having dimensions in the physical display space, and render graphical targets having locations in the local client viewport to the local client screen space as a function of the mapping;
        determine the location and dimensions in the virtual workspace of the local client viewport, the logic to determine including:
            (i) a first mode to change the local client viewport in response to user input at the first network node; and
            (ii) a second mode to monitor messages containing locations and changes of location in the virtual workspace of the remote client viewport from a second network node in the one or more network nodes, and upon retrieval of the viewport change event changing the local client viewport using the locations and changes of location contained in the messages, wherein:
the local client screen space and the remote client screen space have different dimensions and the logic to change the local client viewport defines dimensions of the local client viewport so that the remote client viewport falls within the changed local client viewport rendered in the local client screen space; and
record entries in the log of events including the entries of the viewport change event.

2. The network node of claim 1, including a graphical user interface using the physical display space, the graphical user interface including user input constructs for selection of the second network node.

3. The network node of claim 1, wherein the local client screen space has static dimensions in the physical display space.

4. The network node of claim 1, wherein the local client screen space has a static resolution including a number of pixels, and the dimensions of the local client viewport define a changeable resolution including a number of virtual pixels in the virtual workspace, and
the logic to compute a mapping determines a zoom factor based on differences in the static resolution and the changeable resolution.

5. The network node of claim 1, wherein entries in the log include records of events,
a record of an event including an identifier of an action, a location in the virtual workspace of a graphical target of the action, a time of the action, and a target identifier of the graphical target.

6. The network node of claim 1, including:
a user interface displaying a list of location markers in the virtual workspace in the session, a location marker having a marked location in the workspace, and for receiving input indicating a selected location marker from the list; and
the logic to determine the location and dimensions in the virtual workspace of the local client viewport is responsive to the input indicating the selected location marker, to update the location of the local client viewport to the marked location.

7. The network node of claim 1, including logic to send messages to other network nodes, the messages identifying locations and changes of locations made in the first mode of the local client viewport, the messages including a specification of dimensions in the virtual workspace of the local client viewport.

8. A method for operating a network node having a display having a physical display space, a user input device, a processor and a communication port, the method comprising:
establishing communication with one or more other network nodes;
storing collaboration data identifying graphical targets having locations in a virtual workspace, the collaboration data including ji) locations in the virtual workspace of the identified graphical targets and (ii) a log of events relating to the graphical targets having locations in the workspace and including entries of a viewport change event comprising a remote client viewport's specification of dimensions to be displayed on a local client viewport, wherein the remote client viewport and local client viewports are viewports of different or overlapping areas of the virtual workspace;
computing a mapping of a local client viewport having a location and dimensions in the virtual workspace to a local client screen space having dimensions in the physical display space, and render graphical targets having locations in the local client viewport to the local client screen space as a function of the mapping;
determining the location and dimensions in the virtual workspace of the local client viewport, including:
(i) in a first mode, changing the local client viewport in response to user input at the network node; and
(ii) in a second mode to monitor messages containing locations and changes of location in the virtual workspace of the remote client viewport from a second network node in the one or more network nodes, and upon retrieval of the viewport change event changing the local client viewport using the locations and changes of location contained in the messages, wherein the local client screen space and the remote client screen space have different dimensions, and
defining dimensions of the local client viewport so that the remote client viewport falls within the changed local client viewport rendered in the local client screen space; and
recording entries in the log of events including the entries of the viewport change event.

9. The method of claim 8, including a executing a graphical user interface using the physical display space, the graphical user interface including user input constructs for selection of the second network node.

10. The method of claim 8, wherein the local client screen space has static dimensions in the physical display space.

11. The method of claim 8, wherein the local client screen space has a static resolution including a number of pixels, and the dimensions of the local client viewport define a changeable resolution including a number of virtual pixels in the virtual workspace, and 4 including determining a zoom factor based on differences in the static resolution and the changeable resolution.

12. The method of claim 8, wherein the collaboration data includes a log of events relating to the graphical targets having locations in the workspace, where entries in the log include records of events, a record of an event including an identifier of an action, a location in the virtual workspace of a graphical target of the action, a time of the action, and a target identifier of the graphical target.

13. The method of claim 8, including: providing a user interface displaying a list of location markers in the virtual workspace in the session, a location marker having a marked location in the workspace, and for receiving input indicating a selected location marker from the list; and determining the location and dimensions in the virtual workspace of the local client viewport in response to the input indicating the selected location marker, and updating the location of the local client viewport to the marked location.

14. The method of claim 8, including sending messages to other network nodes, the messages identifying locations and changes of locations made in the first mode of the local client viewport, the messages including a specification of dimensions in the virtual workspace of the local client viewport.

15. A product comprising a non-transitory computer readable memory and a computer program stored in the memory for use in a first network node having a display having a physical display space, a user input device, a processor and a communication port, the computer program including logic to: establish communication with one or more other network nodes;

store collaboration data identifying graphical targets having locations in a virtual workspace, the collaboration data including (i) locations in the virtual workspace of the identified graphical targets and (ii) a log of events relating to the graphical targets having locations in the workspace and including entries of a viewport change event comprising a remote client viewport's specification of dimensions to be displayed on a local client viewport, wherein the remote client viewport and local client viewports are viewports of different or overlapping areas of the virtual workspace;

compute a mapping of the local client viewport having a location and dimensions in the virtual workspace to a local client screen space having dimensions in the physical display space, and render graphical targets having locations in the local client viewport to the local client screen space as a function of the mapping;

determine the location and dimensions in the virtual workspace of the local client viewport, the logic to determine including:

(i) a first mode to change the local client viewport in response to user input at the first network node; and (ii) a second mode to monitor messages containing locations and changes of location in the virtual workspace of the remote client viewport from a second network node in the one or more network nodes, and upon retrieval of the viewport change event changing the local client viewport using the locations and changes of location contained in the messages, wherein:

the local client screen space and the remote client screen space have different dimensions and the logic to change the local client viewport defines dimensions of the local client viewport so that the remote client viewport falls within the changed local client viewport rendered in the local client screen space; and record entries in the log of events including the entries of the viewport change event.

16. The product of claim 15, the logic including a graphical user interface using the physical display space, the graphical user interface including user input constructs for selection of the second network node.

17. The product of claim 15, wherein the local client screen space has static dimensions in the physical display space.

18. The product of claim 15, wherein the local client screen space has a static resolution including a number of pixels, and the dimensions of the local client viewport define a changeable resolution including a number of virtual pixels in the virtual workspace, and the logic to compute a mapping determines a zoom factor based on differences in the static resolution and the changeable resolution.

19. The product of claim 15, wherein the collaboration data includes a log of events relating to the graphical targets having locations in the workspace, where entries in the log including include records of events, a record of an event including an identifier of an action, a location in the virtual workspace of a graphical target of the action, a time of the action, and a target identifier of the graphical target.

20. The product of claim 15, the program including: a user interface displaying a list of location markers in the virtual workspace in the session, a location marker having a marked location in the workspace, and for receiving input indicating a selected location marker from the list; and wherein the logic to determine the location and dimensions in the virtual workspace of the local client viewport is responsive to the input indicating the selected location marker, to update the location of the local client viewport to the marked location.

21. The product of claim 15, the program including logic to send messages to other network nodes, the messages identifying locations and changes of locations 3 made in the first mode of the local client viewport, the messages including a specification of dimensions in the virtual workspace of the local client viewport.

* * * * *